(12) United States Patent
Walther et al.

(10) Patent No.: US 9,809,703 B2
(45) Date of Patent: Nov. 7, 2017

(54) ETHYLENE-BASED POLYMER COMPOSITIONS WITH IMPROVED VISCOSITIES

(71) Applicants: Brian W. Walther, Clute, TX (US); Timothy E. Clayfield, Waedenswil (CH); Curvel Hypolite, Rosharon, TX (US)

(72) Inventors: Brian W. Walther, Clute, TX (US); Timothy E. Clayfield, Waedenswil (CH); Curvel Hypolite, Rosharon, TX (US)

(73) Assignee: DOW GLOBAL TECHNOLOGIES LLC, Midland, MI (US)

( * ) Notice: Subject to any disclaimer, the term of this patent is extended or adjusted under 35 U.S.C. 154(b) by 35 days.

(21) Appl. No.: 14/368,980

(22) PCT Filed: Dec. 27, 2012

(86) PCT No.: PCT/US2012/071828
§ 371 (c)(1),
(2) Date: Jun. 26, 2014

(87) PCT Pub. No.: WO2013/101933
PCT Pub. Date: Jul. 4, 2013

(65) Prior Publication Data
US 2014/0378602 A1 Dec. 25, 2014

Related U.S. Application Data

(60) Provisional application No. 61/581,135, filed on Dec. 29, 2011.

(51) Int. Cl.
*C08L 23/00* (2006.01)
*C08L 23/16* (2006.01)
*C08L 23/08* (2006.01)

(52) U.S. Cl.
CPC .......... *C08L 23/16* (2013.01); *C08L 23/0807* (2013.01); *C08L 23/0815* (2013.01); *C08L 2205/02* (2013.01); *C08L 2205/025* (2013.01)

(58) Field of Classification Search
CPC ....................................................... C08L 23/16
See application file for complete search history.

(56) References Cited

U.S. PATENT DOCUMENTS

| | | | |
|---|---|---|---|
| 3,884,993 A * | 5/1975 | Gros | ........................ C08J 3/005 525/192 |
| 5,359,015 A | 10/1994 | Jejelowo | |
| 5,449,713 A | 9/1995 | Nakahama | |
| 5,552,489 A | 9/1996 | Merrill et al. | |
| 6,005,053 A † | 12/1999 | Parikh et al. | |
| 6,114,457 A | 9/2000 | Markel et al. | |
| 6,120,887 A | 9/2000 | Werenicz et al. | |
| 6,147,180 A | 11/2000 | Markel et al. | |
| 6,271,311 B1 | 8/2001 | Ravishankar et al. | |
| 6,319,998 B1 | 11/2001 | Cozewith et al. | |
| 7,166,676 B2 * | 1/2007 | Jacobsen et al. | ......... D01F 6/46 525/240 |
| 7,531,601 B2 | 5/2009 | Karjala et al. | |
| 7,759,415 B2 | 7/2010 | Coffey et al. | |
| 8,034,878 B2 † | 10/2011 | Karjala et al. | |
| 8,129,472 B2 * | 3/2012 | Turner et al. | ........... C08L 23/04 525/191 |
| 2003/0114596 A1 | 6/2003 | Inagaki et al. | |
| 2008/0016467 A1 | 1/2008 | Chambers et al. | |
| 2008/0125547 A1 | 5/2008 | Swogger et al. | |
| 2008/0306217 A1* | 12/2008 | Karjala et al. | ........... C08F 10/00 525/207 |
| 2009/0076216 A1 | 3/2009 | Kiss et al. | |

FOREIGN PATENT DOCUMENTS

| | | |
|---|---|---|
| EP | 1472295 A2 | 11/2004 |
| WO | 9729138 A1 | 8/1997 |
| WO | 2011/008837 A1 | 1/2011 |

OTHER PUBLICATIONS

International Search Report and Written Opinion of the Internatioal Searching Authority for PCT/US2012/071828, dated Mar. 20, 2013, pp. 1-29.
International Preliminary Report on Patentability for PCT/US2012/071828, dated Jul. 1, 2014, pp. 1-4.
Karjala et al., "Detection of Low Levels of Long-Chain Branching in Polydisperse Polyethylene Materials", J. Applied Polymer Science, vol. 119, p. 636-646, 2011 and online Jul. 27, 2010.†

* cited by examiner
† cited by third party

*Primary Examiner* — Irina Krylova (57) ABSTRACT

The invention provides a composition comprising a first composition comprising the following: A) a first ethylene/α-olefin interpolymer that has a weight average molecular weight (Mw) greater than 90,000 g/mole and a MWD less than, or equal to 3, each as determined by conventional GPC; B) a second ethylene/α-olefin interpolymer; and wherein the first composition has a number average molecular weight (Mn) less than 10,000 g/mole, as determined by conventional GPC; and wherein the α-olefin of first interpolymer is the same as the α-olefin of the second interpolymer.

12 Claims, 3 Drawing Sheets

GPC MWD Overlay

FIG. 4

GPC MWD Overlay

FIG. 5

ETHYLENE-BASED POLYMER COMPOSITIONS WITH IMPROVED VISCOSITIES

REFERENCE TO RELATED APPLICATIONS

The present application claims the benefit of U.S. Provisional Application No. 61/581,135, filed Dec. 29, 2011.

BACKGROUND OF THE INVENTION

High molecular weight ethylene-based polymers are known to possess a number of advantaged performance properties, such as, for example, increased tensile strength, increased ability to be filled with a range of additives, and improved compression set. In a solution polymerization process, the polymer is dissolved typically in a non-reactive solvent, producing a polymer stream that is transferred throughout the process via multiple pumps. In such a process, the resulting viscosity of the polymer stream becomes prohibitively high to transfer the high molecular weight polymer through the process. Transfer of the polymer stream becomes even more of a challenge once the bulk of the solvent is removed in the devolatilization process.

There is a need for new, energy efficient polymerization processes for the formation of high molecular weight ethylene-based polymers. There is a further need for such high molecular weight polymers.

U.S. Publication 2009/0076216 discloses a process for a fluid phase, in-line blending of plasticized polymers. The process includes providing two or more reactor trains configured in parallel, and a separator for product blending and product-feed separation. The one or more of the reactor trains produce one or more polymers, and one or more of the reactor trains produce one or more plasticizers. Suitable plasticizers include polyalphaolefin oligomers, polybutenes, low glass transition temperature polymers and combinations thereof.

U.S. Pat. No. 7,759,415 discloses a method to make an article comprising the steps of combining a semi-amorphous polymer, having a heat of fusion of less than 70 J/g, with a plasticizer, and optionally one or more additives, to produce a polymer concentrate; combining the polymer concentrate with one or more final materials, to produce an article precursor; and forming the article at least partially from the article precursor. The polymer concentrate is disclosed as having no visible phase separation, as demonstrated by the polymer concentrate having no visually detectable loss of the plasticizer, after a portion of the polymer concentrate is aged on an absorbent surface for 24 hours at 25° C.

U.S. Pat. No. 5,552,489 discloses tackifiers having number average molecular weights of 5,000 or less, and glass transition temperatures above 0° C. The tackifiers are produced by combining a single site catalyst with an alpha-olefin and a cyclic monomer, under conditions designed to produce low molecular weight.

U.S. Pat. No. 6,271,311 discloses extruded shapes, profiles, and parts, in general, based on an ethylene, alpha-olefin elastomeric polymers that are manufactured utilizing a tailored approach to polymerization. The ethylene, alpha-olefin elastomeric polymer has a broader molecular weight distribution than generally available from metallocene catalyzed elastomeric polymers.

European Patent EP 1472295B1 discloses synthetic polymers, generally with improved balance of processability, resilience and durability. These polymers are generally of the ethylene, alpha-olefin, diene terpolymer type.

Additional polymers and polymerization process are disclosed in the following: U.S. Pat. Nos. 3,884,993, 6,120,887, 6,114,457, 6,147,180, 6,319,998, 5,359,015, 7,531,601; U.S. Publication 2008/0125547; and International Publication Nos. WO 97/29138 and WO 11/008837.

There remains a need for high molecular weight ethylene-based polymer compositions with lower viscosities, and thus, improved processabilities. There is also a need for energy efficient polymerizations for the formation of such high molecular weight ethylene-based polymers. These needs and others have been met by the following invention.

SUMMARY OF THE INVENTION

The invention provides a composition comprising a first composition comprising the following:

A) a first ethylene/α-olefin interpolymer that has a weight average molecular weight (Mw) greater than 90,000 g/mole and a MWD less than, or equal to 3, each as determined by conventional GPC;

B) a second ethylene/α-olefin interpolymer; and wherein the first composition has a number average molecular weight (Mn) less than 10,000 g/mole, as determined by conventional GPC; and wherein the α-olefin of first interpolymer is the same as the α-olefin of the second interpolymer.

DETAILED DESCRIPTION OF THE INVENTION

As discussed above, the invention provides a composition comprising a first composition comprising the following:

A) a first ethylene/α-olefin interpolymer that has a weight average molecular weight (Mw) greater than 90,000 g/mole and a molecular weight distribution (MWD) less than, or equal to 3, each as determined by conventional GPC;

B) a second ethylene/α-olefin interpolymer; and wherein the first composition has a number average molecular weight (Mn) less than 10,000 g/mole, as determined by conventional GPC; and wherein the α-olefin of first interpolymer is the same as the α-olefin of the second interpolymer.

The inventive composition may comprise a combination of two or more embodiments as described herein.

In a preferred embodiment, the second ethylene/α-olefin interpolymer has a lower Mw compared to the Mw of the first interpolymer, as determined by conventional GPC.

In one embodiment, first composition has a Mn less than, or equal to, 7,000 g/mole, or less than, or equal to, 6,000 g/mole, or less than, or equal to, 5,000 g/mole, as determined by conventional GPC.

In one embodiment, first composition has a Mn less than, or equal to, 4,000 g/mole, or less than, or equal to, 3,000 g/mole, or less than, or equal to, 2,500 g/mole, as determined by conventional GPC.

In one embodiment, first composition has a Mn greater than, or equal to, 500 g/mole, or greater than, or equal to, 600 g/mole, or greater than, or equal to, 800 g/mole, as determined by conventional GPC.

In one embodiment, the first ethylene/α-olefin interpolymer is an ethylene/α-olefin/non-conjugated polyene. In another embodiment, the first ethylene/α-olefin interpolymer is an ethylene/α-olefin copolymer.

In one embodiment, the second ethylene/α-olefin interpolymer is an ethylene/α-olefin/non conjugated polyene. In another embodiment, the second ethylene/α-olefin interpolymer is an ethylene/α-olefin copolymer.

In one embodiment, first ethylene/α-olefin interpolymer has a MWD less than, or equal to, 2.9, or less than, or equal to, 2.8, or less than, or equal to, 2.7, as determined by conventional GPC. In a further embodiment, the first ethylene/α-olefin interpolymer is an ethylene/α-olefin/non conjugated polyene, and further an EPDM. In another embodiment, the first ethylene/α-olefin interpolymer is an ethylene/α-olefin copolymer. Suitable α-olefins include C3-C10 α-olefins.

In one embodiment, the second ethylene/α-olefin interpolymer that has a weight average molecular weight less than 10,000 g/mole and a MWD less than, or equal to, 3.0, or less than, or equal to, 2.7, each as determined from conventional GPC. In a further embodiment, the second ethylene/α-olefin interpolymer is an ethylene/α-olefin/non conjugated polyene, and further an EPDM. In another embodiment, the second ethylene/α-olefin interpolymer is an ethylene/α-olefin copolymer. Suitable α-olefins include C3-C10 α-olefins.

In one embodiment, the second ethylene/α-olefin interpolymer that has a weight average molecular weight less than 5,000 g/mole and a MWD less than, or equal to, 3.0, or less than, or equal to, 2.7, each as determined from conventional GPC. In a further embodiment, the second ethylene/α-olefin interpolymer is an ethylene/α-olefin/non conjugated polyene, and further an EPDM. In another embodiment, the second ethylene/α-olefin interpolymer is an ethylene/α-olefin copolymer. Suitable α-olefins include C3-C10 α-olefins.

In one embodiment, the second ethylene/α-olefin interpolymer that has a weight average molecular weight less than 3,500 g/mole and a MWD less than, or equal to, 3.0, or less than, or equal to, 2.7, each as determined from conventional GPC. In a further embodiment, the second ethylene/α-olefin interpolymer is an ethylene/α-olefin/non conjugated polyene, and further an EPDM. In another embodiment, the second ethylene/α-olefin interpolymer is an ethylene/α-olefin copolymer. Suitable α-olefins include C3-C10 α-olefins.

In one embodiment, the first ethylene/α-olefin interpolymer and the second ethylene/α-olefin interpolymer are both ethylene/α-olefin/diene interpolymers. In a further embodiment, the α-olefin is a C3-C10 α-olefin.

In one embodiment, the first interpolymer is an EPDM(1), and the second interpolymer is an EPDM(2). In a further embodiment, the diene in EPDM(1) is 5-ethylidene-2-norbornene (ENB), and the diene in EPDM(2) is 5-ethylidene-2-norbornene (ENB).

In one embodiment, the first ethylene/α-olefin interpolymer and the second ethylene/α-olefin interpolymer are both ethylene/α-olefin copolymers.

In one embodiment, components A and B comprises greater than, or equal to, 80 weight percent of the first composition, based on the weight of the first composition.

In one embodiment, components A and B comprises greater than, or equal to, 90 weight percent of the first composition, based on the weight of the first composition.

In one embodiment, components A and B comprises greater than, or equal to, 95 weight percent of the first composition, based on the weight of the first composition.

In one embodiment, the first composition has a MWD greater than, or equal to, 15, further greater than, or equal to 20, as determined by conventional GPC.

In one embodiment, the first composition has a MWD greater than, or equal to, 30, further greater than, or equal to, 40, as determined by conventional GPC.

In one embodiment, the first composition has a MWD greater than, or equal to, 50, further greater than, or equal to, 60, as determined by conventional GPC.

In one embodiment, the first composition has a MWD greater than, or equal to, 70, further greater than, or equal to, 80, as determined by conventional GPC.

In one embodiment, the first composition has a MWD less than, or equal to, 200, further less than, or equal to, 150, as determined by conventional GPC.

In one embodiment, the first composition has a density from 0.855 to 0.910 g/cc, or from 0.860 to 0.900 g/cc, or from 0.870 to 0.890 g/cc.

In one embodiment, the density of the first ethylene/α-olefin interpolymer is from 0.850 to 0.930 g/cc, and the density of the second ethylene/α-olefin interpolymer is from 0.850 to 0.930 g/cc. In a further embodiment, both the first and second ethylene/α-olefin interpolymers are ethylene/α-olefin/non conjugated polyene terpolymers, and further EPDMs. In another embodiment, both the first and second ethylene/α-olefin interpolymers are ethylene/α-olefin copolymers. Suitable α-olefins include C3-C10 α-olefins.

In one embodiment, the density of the first ethylene/α-olefin interpolymer is from 0.850 to 0.910 g/cc, and the density of the second ethylene/α-olefin interpolymer is from 0.850 to 0.910 g/cc. In a further embodiment, both the first and second ethylene/α-olefin interpolymers are ethylene/α-olefin/non conjugated polyene terpolymers, and further EPDMs. In another embodiment, both the first and second ethylene/α-olefin interpolymers are ethylene/α-olefin copolymers. Suitable α-olefins include C3-C10 α-olefins.

In one embodiment, the density of the first ethylene/α-olefin interpolymer is from 0.860 to 0.900 g/cc, and the density of the second ethylene/α-olefin interpolymer is from 0.860 to 0.900 g/cc. In a further embodiment, both the first and second ethylene/α-olefin interpolymers are ethylene/α-olefin/non conjugated polyene terpolymers, and further EPDMs. In another embodiment, both the first and second ethylene/α-olefin interpolymers are ethylene/α-olefin copolymers. Suitable α-olefins include C3-C10 α-olefins.

In one embodiment, the density of the first ethylene/α-olefin interpolymer is from 0.870 to 0.890 g/cc, and the density of the second ethylene/α-olefin interpolymer is from 0.870 to 0.890 g/cc. In a further embodiment, both the first and second ethylene/α-olefin interpolymers are ethylene/α-olefin/non conjugated polyene terpolymers, and further EPDMs. In another embodiment, both the first and second ethylene/α-olefin interpolymers are ethylene/α-olefin copolymers. Suitable α-olefins include C3-C10 α-olefins.

In one embodiment, the alpha-olefin of the first ethylene/α-olefin interpolymer is selected from propylene, 1-butene, 1-hexene or 1-octene. In a further embodiment, the first ethylene/α-olefin interpolymer is an ethylene/α-olefin/non conjugated polyene, and further an EPDM. In another embodiment, the first ethylene/α-olefin interpolymer is an ethylene/α-olefin copolymer. Suitable α-olefins include C3-C10 α-olefins.

In one embodiment, the alpha-olefin of the second ethylene/α-olefin interpolymer is selected from propylene, 1-butene, 1-hexene or 1-octene. In a further embodiment, the second ethylene/α-olefin interpolymer is an ethylene/α-olefin/non conjugated polyene, and further an EPDM. In another embodiment, the second ethylene/α-olefin interpolymer is an ethylene/α-olefin copolymer. Suitable α-olefins include C3-C10 α-olefins.

In one embodiment, the alpha-olefin is selected from propylene, 1-butene, 1-hexene or 1-octene.

In one embodiment, the ratio of the weight average molecular weight of the first interpolymer to the weight average molecular weight of the second interpolymer, Mw(first)/Mw(second), is greater than 100, as determined by conventional GPC.

In one embodiment, the ratio of the weight average molecular weight of the first interpolymer to the weight average molecular weight of the second interpolymer, Mw(first)/Mw(second), is greater than 150, as determined by conventional GPC.

In one embodiment, the weight ratio of the ethylene content in the second interpolymer to the ethylene content in the first interpolymer (EE(2)/EE(1)) is from 0.90 to 1.10. Each ethylene content is determined from FTIR, as discussed below.

In one embodiment, the absolute difference in the α-olefin content of the first interpolymer and the second interpolymer is less than 5 weight percent, wherein each weight percent is based on the weight of the respective interpolymer.

In one embodiment, the absolute difference in the α-olefin content of the first interpolymer and the second interpolymer is less than 3 weight percent, wherein each weight percent is based on the weight of the respective interpolymer.

In one embodiment, the absolute difference in the α-olefin content of the first interpolymer and the second interpolymer is less than 1 weight percent, wherein each weight percent is based on the weight of the respective interpolymer.

In one embodiment, the first ethylene/α-olefin interpolymer is an ethylene/α-olefin/diene terpolymer, and the second ethylene/α-olefin interpolymer is an ethylene/α-olefin/diene terpolymer. In a further embodiment, the difference (absolute) in the diene content of the second interpolymer and the first interpolymer (diene (2)–diene (1)) is less than 0.3 weight percent. Each diene content is determined from FTIR, as discussed below.

In one embodiment, the first composition comprises from 2 to 98, or from 5 to 95, or from 30 to 95 weight percent, of the first interpolymer, and from 98 to 2, or from 95 to 5, or from 70 to 5 weight percent, of the second interpolymer, and wherein each weight percentage is based on the sum weight of the first interpolymer and the second interpolymer. In a further embodiment, both the first and second ethylene/α-olefin interpolymers are ethylene/α-olefin/non conjugated polyene terpolymers, and further EPDMs. In another embodiment, both the first and second ethylene/α-olefin interpolymers are ethylene/α-olefin copolymers. Suitable α-olefins include C3-C10 α-olefins.

In one embodiment, the first composition comprises from 50 to 95, or from 60 to 95, or from 70 to 95, or from 80 to 95 weight percent, of the first interpolymer, and from 50 to 5, or from 40 to 5, or from 30 to 5, or from 20 to 5 weight percent, of the second interpolymer, and wherein each weight percentage is based on the sum weight of the first interpolymer and the second interpolymer. In a further embodiment, both the first and second ethylene/α-olefin interpolymers are ethylene/α-olefin/non conjugated polyene terpolymers, further EPDMs. In another embodiment, both the first and second ethylene/α-olefin interpolymers are ethylene/α-olefin copolymers. Suitable α-olefins include C3-C10 α-olefins.

In one embodiment, the first composition has a weight average molecular weight greater than, or equal to, 50,000 g/mole, or greater than, or equal to, 70,000 g/mole, or greater than, or equal to, 100,000 g/mole, as determined by conventional GPC.

In one embodiment, the first composition has a weight average molecular weight less than, or equal to, 1,000,000 g/mole, or less than, or equal to, 500,000 g/mole, or less than, or equal to, 300,000 g/mole, as determined by conventional GPC.

In one embodiment, the first composition has a weight average molecular weight (Mw(conv)) from 50,000 to 1,000,000 g/mole, or from 50,000 to 500,000 g/mole, or from 50,000 to 300,000 g/mole, as determined by conventional GPC.

In one embodiment, the first interpolymer has a weight average molecular weight greater than, or equal to, 100,000 g/mole, or greater than, or equal to, 110,000 g/mole, or greater than, or equal to, 120,000 g/mole, as determined by conventional GPC.

In one embodiment, the first interpolymer has a weight average molecular weight less than, or equal to, 2,000,000 g/mole, or less than, or equal to, 1,500,000 g/mole, or less than, or equal to, 1,000,000 g/mole, or less than, or equal to, 500,000 g/mole, as determined by conventional GPC.

In one embodiment, the first interpolymer has a weight average molecular weight less than, or equal to, 400,000 g/mole, or less than, or equal to, 350,000 g/mole, or less than, or equal to, 300,000 g/mole, as determined by conventional GPC.

In one embodiment, the second interpolymer has a molecular weight distribution (MWD) less than, or equal to, 3.0, or less than, or equal to, 2.9, more or less than, or equal to, 2.8, or less than, or equal to, 2.7, as determined by conventional GPC. In a further embodiment, the second ethylene/α-olefin interpolymer is an ethylene/α-olefin/non conjugated polyene, and further an EPDM. In another embodiment, the second ethylene/α-olefin interpolymer is an ethylene/α-olefin copolymer. Suitable α-olefins include C3-C10 α-olefins.

In one embodiment, the first interpolymer and the second polymer, each has a molecular weight distribution (MWD) less than, or equal to, 3.0, preferably less than, or equal to, 2.8, more preferably less than, or equal to, 2.6, as determined by conventional GPC. In a further embodiment, both the first and second ethylene/α-olefin interpolymers are ethylene/α-olefin/non conjugated polyene terpolymers, and further EPDMs. In another embodiment, both the first and second ethylene/α-olefin interpolymers are ethylene/α-olefin copolymers. Suitable α-olefins include C3-C10 α-olefins.

In one embodiment, the first interpolymer has a weight average molecular weight (Mw(conv)) from 50,000 to 1,000,000 g/mole, or from 50,000 to 500,000 g/mole, or from 50,000 to 300,000 g/mole, as determined by conventional GPC. In a further embodiment, the first ethylene/α-olefin interpolymer is an ethylene/α-olefin/non conjugated polyene, and further an EPDM. In another embodiment, the first ethylene/α-olefin interpolymer is an ethylene/α-olefin copolymer. Suitable α-olefins include C3-C10 α-olefins.

In one embodiment, the first interpolymer has a molecular weight distribution (MWD) from 1.7 to 3.0, or from 2.0 to 3.0, as determined by conventional GPC. In a further embodiment, the first ethylene/α-olefin interpolymer is an ethylene/α-olefin/non conjugated polyene, and further an EPDM. In another embodiment, the first ethylene/α-olefin interpolymer is an ethylene/α-olefin copolymer. Suitable α-olefins include C3-C10 α-olefins.

In one embodiment, the α-olefin of the first interpolymer is selected from a C3-C10 α-olefin (preferably an acyclic C3-C10 α-olefin), or a C4-C8 α-olefin (preferably an acyclic C4-C8 α-olefin). In a further embodiment, the first ethylene/α-olefin interpolymer is an ethylene/α-olefin/non conjugated polyene, and further an EPDM. In another embodiment, the first ethylene/α-olefin interpolymer is an ethylene/α-olefin copolymer. Suitable α-olefins include C3-C10 α-olefins.

In one embodiment, the second interpolymer has a weight average molecular weight greater than, or equal to, 300 g/mole, or greater than, or equal to, 400 g/mole, or greater than, or equal to, 500 g/mole, as determined by conventional GPC. In a further embodiment, the second ethylene/α-olefin interpolymer is an ethylene/α-olefin/non conjugated polyene, and further an EPDM. In another embodiment, the second ethylene/α-olefin interpolymer is an ethylene/α-olefin copolymer. Suitable α-olefins include C3-C10 α-olefins.

In one embodiment, the second interpolymer has a weight average molecular weight less than, or equal to, 5000 g/mole, or less than, or equal to, 4500 g/mole, or less than, or equal to, 4000 g/mole, as determined by conventional GPC. In a further embodiment, the second ethylene/α-olefin interpolymer is an ethylene/α-olefin/non conjugated polyene, and further an EPDM. In another embodiment, the second ethylene/α-olefin interpolymer is an ethylene/α-olefin copolymer. Suitable α-olefins include C3-C10 α-olefins.

In one embodiment, the second interpolymer has a weight average molecular weight (Mw(conv)) from 300 to 5000 g/mole, or from 450 to 4500 g/mole, or from 500 to 4000 g/mole, as determined by conventional GPC. In a further embodiment, the second ethylene/α-olefin interpolymer is an ethylene/α-olefin/non conjugated polyene, and further an EPDM. In another embodiment, the second ethylene/α-olefin interpolymer is an ethylene/α-olefin copolymer. Suitable α-olefins include C3-C10 α-olefins.

In one embodiment, the second interpolymer has a number average molecular weight less than, or equal to, 2000 g/mole, or less than, or equal to, 1800 g/mole, or less than, or equal to, 1500 g/mole, or less than, or equal to, 1000 g/mole, as determined by conventional GPC. In a further embodiment, the second ethylene/α-olefin interpolymer is an ethylene/α-olefin/non conjugated polyene, and further an EPDM. In another embodiment, the second ethylene/α-olefin interpolymer is an ethylene/α-olefin copolymer. Suitable α-olefins include C3-C10 α-olefins.

In one embodiment, the second interpolymer has a number average molecular weight less than, or equal to, 800 g/mole, or less than, or equal to, 700 g/mole, or less than, or equal to, 600 g/mole, as determined by conventional GPC. In a further embodiment, the second ethylene/α-olefin interpolymer is an ethylene/α-olefin/non conjugated polyene, and further an EPDM. In another embodiment, the second ethylene/α-olefin interpolymer is an ethylene/α-olefin copolymer. Suitable α-olefins include C3-C10 α-olefins.

In one embodiment, the second interpolymer has a number average molecular weight greater than, or equal to, 100 g/mole, or greater than, or equal to, 150 g/mole, as determined by conventional GPC. In a further embodiment, the second ethylene/α-olefin interpolymer is an ethylene/α-olefin/non conjugated polyene, and further an EPDM. In another embodiment, the second ethylene/α-olefin interpolymer is an ethylene/α-olefin copolymer. Suitable α-olefins include C3-C10 α-olefins.

In one embodiment, the second polymer has a number average molecular weight from 150 to 2000 g/mole, or from 200 to 1800 g/mole, as determined by conventional GPC. In a further embodiment, the second ethylene/α-olefin interpolymer is an ethylene/α-olefin/non conjugated polyene, and further an EPDM. In another embodiment, the second ethylene/α-olefin interpolymer is an ethylene/α-olefin copolymer. Suitable α-olefins include C3-C10 α-olefins.

In one embodiment, the second interpolymer has a molecular weight distribution (MWD) from 1.7 to 3.5, or from 1.8 to 3.0, as determined by conventional GPC. In a further embodiment, the second ethylene/α-olefin interpolymer is an ethylene/α-olefin/non conjugated polyene, and further an EPDM. In another embodiment, the second ethylene/α-olefin interpolymer is an ethylene/α-olefin copolymer. Suitable α-olefins include C3-C10 α-olefins.

In one embodiment, the α-olefin of the second interpolymer is selected from a C3-C10 α-olefin (preferably an acyclic C3-C10 α-olefin), or a C4-C8 α-olefin (preferably an acyclic C4-C8 α-olefin). In a further embodiment, the second ethylene/α-olefin interpolymer is an ethylene/α-olefin/non conjugated polyene, and further an EPDM. In another embodiment, the second ethylene/α-olefin interpolymer is an ethylene/α-olefin copolymer. Suitable α-olefins include C3-C10 α-olefins.

In one embodiment, the first interpolymer and the second interpolymer are prepared sequentially in one reactor.

In one embodiment, the weight ratio of component A to component B is from 8/2 to 1/1, or from 8/2 to 1/1, or from 7/3 to 1/1.

In one embodiment, the weight ratio of component A to component B is greater than, or equal to, 1.0, or greater than, or equal to, 1.2, or greater than, or equal to, 1.5.

In one embodiment, the weight ratio of component A to component B is less than, or equal to, 4.0, or less than, or equal to, 3.5, or less than, or equal to, 3.0.

In one embodiment, the first composition has a Mooney Viscosity (MV 1+4 (125° C.)) greater than 5, or greater than 10.

In one embodiment, the first composition has a Mooney Viscosity (MV 1+4 (125° C.)) greater than 20, or greater than 30.

In one embodiment, the first composition has a Mooney Viscosity (MV 1+4 (125° C.)) less than 200, or less than 150.

In one embodiment, the first composition has a Mooney Viscosity (MV 1+4 (125° C.)) from 20 to 100, further from 25 to 80, further from 30 to 60.

In one embodiment, the first composition has a melt index (I2) greater than, or equal to, 0.05 g/10 min, or greater than, or equal to, 0.1 g/10 min, or greater than, or equal to, 0.2 g/10 min, or greater than, or equal to, 0.5 g/10 min.

In one embodiment, the first composition has a melt index (I2) less than, or equal to, 10 g/10 min, or less than 5 g/10 min, or less than 2 g/10 min.

In one embodiment, the composition further comprises at least one additive. In a further embodiment, the composition further comprises at least one additive selected from fillers, crosslinking agents, foaming agents, or combinations thereof.

In one embodiment, the composition is in free-flowing pellet form (at ambient conditions).

An inventive composition may comprise a combination of two or more embodiments as described herein.

A first composition may comprise a combination of two or more embodiments as described herein.

The first ethylene/α-olefin interpolymer may comprise a combination of two or more embodiments as described herein.

The second ethylene/α-olefin interpolymer may comprise a combination of two or more embodiments as described herein.

The invention also provides an article comprising at least one component formed from an inventive composition. In a further embodiment, the article is an extruded article. In a further embodiment, the article is a weather-strip. In another embodiment, the article is an automotive part. In another embodiment, the article is a hose. In another embodiment, the article is a roofing material. In another embodiment, the article is a thermoplastic vulcanizate (TPV). In another embodiment, the article is a footwear component, such a shoe inner sole or shoe outer sole.

The invention also provides a foam formed from an inventive composition.

The invention also provides an article comprising at least one component formed from an inventive foam. In a further embodiment, the article is a weather-strip.

An inventive foam may comprise a combination of two or more embodiments as described herein.

An inventive article may comprise a combination of two or more embodiments as described herein.

The invention also provides a method of forming an inventive composition of one or more embodiments described herein, said method comprising polymerizing at least the following: ethylene and an α-olefin; and wherein the polymerization takes place in at least one reactor; and wherein at least two catalysts are fed together into the reactor; or wherein at least one catalysts is fed into the reactor, and at least one catalyst is fed into a second reactor, operated in series or in parallel. In a further embodiment, the at least two catalysts are fed together into the reactor.

It has been discovered that the inventive compositions have superior product performance at similar product viscosity compared to compositions with a single component. It has also been discovered that the inventive compositions can be produced in a single reactor, and have lower viscosity polymer streams. The ability to produce such polymers in a single reactor has several advantages, including a simplified process control, since only one reactor is needed.

Ethylene/α-Olefin Interpolymers

In one embodiment, both the first and second ethylene/α-olefin interpolymers are ethylene/α-olefin copolymers.

In one embodiment, the first ethylene/α-olefin interpolymer has a density greater than, or equal to, 0.850 g/cc, or greater than, or equal to, 0.855 g/cc, or greater than, or equal to, 0.860 g/cc (1 cc=1 cm$^3$). In a further embodiment, the ethylene/α-olefin interpolymer is an ethylene/α-olefin copolymer.

In one embodiment, the first ethylene/α-olefin interpolymer has a density less than, or equal to, 0.920 g/cc, or less than, or equal to, 0.915 g/cc, or less than, or equal to, 0.910 g/cc, or less than, or equal to, 0.900 g/cc. In a further embodiment, the ethylene/α-olefin interpolymer is an ethylene/α-olefin copolymer.

In a further embodiment, the first ethylene/α-olefin interpolymer has a density from 0.850 to 0.910 g/cc, or from 0.850 to 0.900 g/cc, or from 0.855 to 0.890 g/cc, or from 0.860 to 0.885 g/cc. In a further embodiment, the ethylene/α-olefin interpolymer of is an ethylene/α-olefin copolymer.

In one embodiment, the second ethylene/α-olefin interpolymer has a density greater than, or equal to, 0.850 g/cc, or greater than, or equal to, 0.855 g/cc, or greater than, or equal to, 0.860 g/cc (1 cc=1 cm$^3$). In a further embodiment, the ethylene/α-olefin interpolymer is an ethylene/α-olefin copolymer.

In one embodiment, the second ethylene/α-olefin interpolymer has a density less than, or equal to, 0.920 g/cc, or less than, or equal to, 0.915 g/cc, or less than, or equal to, 0.910 g/cc, or less than, or equal to, 0.900 g/cc. In a further embodiment, the ethylene/α-olefin interpolymer is an ethylene/α-olefin copolymer.

In a further embodiment, the second ethylene/α-olefin interpolymer has a density from 0.850 to 0.910 g/cc, or from 0.850 to 0.900 g/cc, or from 0.855 to 0.890 g/cc, or from 0.860 to 0.885 g/cc. In a further embodiment, the ethylene/α-olefin interpolymer of is an ethylene/α-olefin copolymer.

In one embodiment, the first ethylene/α-olefin interpolymer has a melt index (I2) greater than, or equal to, 0.1 g/10 min, or greater than, or equal to, 0.2 g/10 min, or greater than, or equal to, 0.4 g/10 min. In a further embodiment, the ethylene/α-olefin interpolymer is an ethylene/α-olefin copolymer.

In one embodiment, the first ethylene/α-olefin interpolymer has a melt index (I2) less than, or equal to, 20 g/10 min, or less than, or equal to, 10 g/10 min, or less than, or equal to, 5 g/10 min, or less than, or equal to, 2 g/10 min. In a further embodiment, the ethylene/α-olefin interpolymer is an ethylene/α-olefin copolymer.

In one embodiment, the first ethylene/α-olefin interpolymer has molecular weight distribution (Mw/Mn) greater than, or equal to, 1.2, or greater than, or equal to, 1.5, or greater than, or equal to, 1.8, as determined by conventional GPC. In a further embodiment, the ethylene/α-olefin interpolymer is an ethylene/α-olefin copolymer.

In one embodiment, the first ethylene/α-olefin interpolymer has molecular weight distribution (Mw/Mn) less than, or equal to, 3.5, or less than, or equal to, 3.0, or less than, or equal to, 2.8, or less than, or equal to, 2.6, as determined by conventional GPC. In a further embodiment, the ethylene/α-olefin interpolymer is an ethylene/α-olefin copolymer.

Comonomers include, but are not limited to, propylene, isobutylene, 1-butene, 1-pentene, 1-hexene, 3-methyl-1-pentene, 4-methyl-1-pentene, and 1-octene, polyenes, styrene, halo-substituted styrene, alkyl-substituted styrene, tetrafluoroethylenes, vinylbenzocyclobutene, naphthenics, cycloalkenes (for example, cyclopentene, cyclohexene, cyclooctene), and mixtures thereof. Typically and preferably, the ethylene is copolymerized with one C3-C20 α-olefin (preferably an acyclic C3-C20 α-olefin), and preferably one C3-C10 α-olefin (preferably an acyclic C3-C10 α-olefin). Preferred comonomers include propene, 1-butene, 1-pentene, 1-hexene, 1-heptene and 1-octene, and more preferably include propene, 1-butene, 1-hexene and 1-octene.

Illustrative copolymers include ethylene/propylene (EP) copolymers, ethylene/butene (EB) copolymers, ethylene/hexene (EH) copolymers, ethylene/octene (EO) copolymers. Preferred copolymers include EP, EB, EH and EO polymers.

In one embodiment, both the first interpolymer and the second interpolymer are each independently selected from an EP, an EB, an EH or an EO polymer.

In one embodiment, the first ethylene/α-olefin interpolymer has a melting point (Tm) greater than, or equal to, 20° C., or greater than, or equal to, 25° C. In a further embodiment, the ethylene/α-olefin interpolymer is an ethylene/α-olefin copolymer.

In one embodiment, the first ethylene/α-olefin interpolymer has a melting point (Tm) less than, or equal to, 50° C., or less than, or equal to, 45° C. In a further embodiment, the ethylene/α-olefin interpolymer is an ethylene/α-olefin copolymer.

An ethylene/α-olefin interpolymer may comprise a combination of two or more embodiments as described herein.

An ethylene/α-olefin copolymer may comprise a combination of two or more embodiments as described herein.

Ethylene/α-Olefin/Nonconjugated Polyene Interpolymers

In one embodiment, both the first and second ethylene/α-olefin interpolymers are ethylene/α-olefin/nonconjugated polyene interpolymers. Each ethylene/α-olefin/nonconjugated polyene interpolymer has polymerized therein C2 (ethylene), at least one α-olefin, and a nonconjugated polyene. Suitable examples of α-olefins include the C3-C20 α-olefins (preferably acyclic C3-C20 α-olefins), and preferably C3-C10 α-olefins (preferably acyclic C3-C10 α-olefins). Suitable examples of nonconjugated polyenes include the C4-C40 nonconjugated polyenes. In a preferred embodiment, the interpolymer is an ethylene/-propylene/diene interpolymer, and further an EPDM terpolymer. In a further embodiment, the diene is 5-ethylidene-2-norbornene (ENB).

The α-olefin may be either an aliphatic or an aromatic compound, and may contain vinylic unsaturation or a cyclic compound, such as styrene, p-methyl styrene, cyclobutene, cyclopentene, and norbornene, including norbornene substituted in the 5 and 6 positions with C1-C20 hydrocarbyl groups. The α-olefin is preferably a C3-C20 aliphatic compound, preferably a C3-C16 aliphatic compound, and more preferably a C3-C10 aliphatic compound. Preferred ethylenically unsaturated monomers include 4-vinylcyclohexene, vinylcyclohexane, and C3-C10 aliphatic α-olefins (especially propylene, isobutylene, 1-butene, 1-pentene, 1-hexene, 3-methyl-1-pentene, 4-methyl-1-pentene, 1-octene, 1-decene and 1-dodecene), and more preferably C3-C10 aliphatic α-olefins. A more preferred C3-C10 aliphatic α-olefin is selected from the group consisting of propylene, 1-butene, 1-hexene and 1-octene, and more preferably propylene. In a preferred embodiment, the interpolymer is an EPDM terpolymer. In a further embodiment, the diene is 5-ethylidene-2-norbornene (ENB).

In one embodiment, the nonconjugated polyene is a C6-C15 straight chain, branched chain or cyclic hydrocarbon diene. Illustrative nonconjugated dienes are straight chain acyclic dienes, such as 1,4-hexadiene and 1,5-heptadiene; branched chain acyclic dienes, such as 5-methyl-1,4-hexadiene, 2-methyl-1,5-hexadiene, 6-methyl-1,5-heptadiene, 7-methyl-1,6-octadiene, 3,7-dimethyl-1,6-octadiene, 3,7-dimethyl-1,7-octadiene, 5,7-dimethyl-1,7-octadiene, 1,9-decadiene, and mixed isomers of dihydromyrcene; single ring alicyclic dienes such as 1,4-cyclohexadiene, 1,5-cyclooctadiene and 1,5-cyclododecadiene; multi-ring alicyclic fused and bridged ring dienes, such as tetrahydroindene, methyl tetrahydroindene; alkenyl, alkylidene, cycloalkenyl and cycloalkylidene norbornenes such as 5-methylene-2-norbornene (MNB), 5-ethylidene-2-norbornene (ENB), 5-vinyl-2-norbornene, 5-propenyl-2-norbornene, 5-isopropylidene-2-norbornene, 5-(4-cyclopentenyl)-2-norbornene, and 5-cyclohexylidene-2-norbornene. The diene is preferably a nonconjugated diene selected from the group consisting of ENB, dicyclopentadiene, 1,4-hexadiene, 7-methyl-1,6-octadiene, and preferably, ENB, dicyclopentadiene and 1,4-hexadiene, more preferably ENB and dicyclopentadiene, and even more preferably ENB.

In a preferred embodiment, the first ethylene/α-olefin/nonconjugated polyene interpolymer comprises a majority amount of polymerized ethylene, based on the weight of the interpolymer.

In a preferred embodiment, the second ethylene/α-olefin/nonconjugated polyene interpolymer comprises a majority amount of polymerized ethylene, based on the weight of the interpolymer.

In one embodiment, the first ethylene/α-olefin/nonconjugated polyene interpolymer has a molecular weight distribution (Mw(Conv)/Mn(Conv)) from 1.8 to 3.0, or from 1.9 to 3.0 or from 1.9 to 2.8. In a preferred embodiment, the interpolymer is an ethylene/propylene/diene interpolymer, and further an EPDM terpolymer. In a further embodiment, the diene is ENB.

The example EPDM compositions were made with 5-ethylidene norbornene as the cure site monomer, and other cure site monomers or blends of cure site monomers can also be used, including dicyclopentadiene, vinylidene norbornene, hexadiene, and others. Additional monomers may be added to effect branching, as is known from the art. The practitioner will appreciate that the compositions can be used blended with other polymers and compounding additives, and can used in typical shaping processes, such as extrusion, calendaring and molding processes.

An ethylene/α-olefin/nonconjugated polyene interpolymer may comprise a combination of two or more embodiments as described herein.

An ethylene/alpha-olefin/diene interpolymer may comprise a combination of two or more embodiments as described herein.

An ethylene/propylene/diene terpolymer may comprise a combination of two or more embodiments as described herein.

Additives

An inventive composition may comprise one or more additives. Suitable additives include, but are not limited to, fillers, antioxidants, UV stabilizers, vulcanizing agents, foaming agents, flame retardants, plasticizers or oils, colorants or pigments, and combinations thereof. In one embodiment, the composition comprises at least one additive selected from fillers, antioxidants, UV stabilizers, vulcanizing agents, foaming agents, plasticizers or oils, or combinations thereof.

Applications

The compositions of the present invention may be used to prepare any of a variety of articles, or their component parts or portions. The inventive compositions are especially suited for foamed, crosslinked extruded profile applications, including weather strip applications. The inventive compositions may be converted into a finished article of manufacture by any one of a number of conventional processes and apparatus. Illustrative processes include, but are not limited to, extrusion, calendering, injection molding, compression molding, and other typical thermoplastic processes. For example, articles can be prepared by injection molding, extrusion, extrusion followed by thermoforming, low pressure molding, compression molding, and the like.

Articles include, but are not limited to, foams, weather strips, belts, hoses, wire and cable jacketing, tubes, flooring materials, gaskets, membranes, molded goods, extruded parts, and adhesives (for example, high viscosity adhesives). Additional articles includes polymer sheets, fibers, coatings, automotive parts (for example, tires and tire components), computer parts, building materials, household appliances, electrical supply housings, trash cans, storage or packaging containers, lawn furniture strips or webbing, lawn mower, garden hose, and other garden appliance parts, refrigerator gaskets, acoustic systems, utility cart parts, desk edging, toys and water craft parts. The compositions can also be used in roofing applications, such as roofing membranes. The compositions can further be used in fabricating a footwear component, including, but not limited to, a shaft for a boot, particularly an industrial work boot. The compositions can also be used in fabricating automotive parts. A skilled artisan can readily augment this list without undue experimentation.

The practitioner will appreciate that the compositions described in this invention can be used in a variety of elastomeric applications. They can be used in thermoplastic or thermoset applications, whereby they can be blended with other polymers according to the art. In thermoset applications, a variety of crosslinking systems can be used, for instance, peroxide, sulfur, phenolic (resol) cure, silane, hydrosililation and irradiation cures, being some examples of suitable crosslinking chemistries. The compositions can also be grafted.

DEFINITIONS

Unless stated to the contrary, all test methods are current as of the filing date of this disclosure.

The term "composition," as used herein, includes a mixture of materials, which comprise the composition, as well as reaction products and decomposition products formed from the materials of the composition.

The term "polymer," as used herein, refers to a polymeric compound prepared by polymerizing monomers, whether of the same or a different type. The generic term polymer thus embraces the term homopolymer (employed to refer to polymers prepared from only one type of monomer, with the understanding that trace amounts of impurities can be incorporated into the polymer structure), and the term interpolymer as defined hereinafter. Trace amounts of residues (for example, catalyst residues) may be incorporated into and/or within the polymer.

The term "interpolymer," as used herein, refers to polymers prepared by the polymerization of at least two different types of monomers. The generic term interpolymer thus includes copolymers (employed to refer to polymers prepared from two different types of monomers), and polymers prepared from more than two different types of monomers.

The term, "ethylene-based polymer," as used herein, refers to a polymer that comprises, in polymerized form, a majority amount of ethylene monomer (based on the weight of the polymer), and optionally may comprise one or more comonomers. For, the "ethylene/α-olefin/nonconjugated polyene interpolymers," the polymerized ethylene is present in an amount greater than 40 weight percent (based on the weight of the interpolymer), and preferably is present in an amount greater than 50 weight percent (based on the weight of the interpolymer).

The term, "ethylene/α-olefin interpolymer," as used herein, refers to an interpolymer that comprises, in polymerized form, a majority amount of ethylene monomer (based on the weight of the interpolymer), and an α-olefin. For, the "ethylene/α-olefin/nonconjugated polyene interpolymers," the polymerized ethylene is present in an amount greater than 40 weight percent (based on the weight of the interpolymer), and preferably is present in an amount greater than 50 weight percent (based on the weight of the interpolymer).

The term, "ethylene/α-olefin copolymer," as used herein, refers to a copolymer that comprises, in polymerized form, a majority amount of ethylene monomer (based on the weight of the copolymer), and an α-olefin, as the only two monomer types.

The term "ethylene/α-olefin/nonconjugated polyene interpolymer," as used herein, refers to a polymer that comprises, in polymerized form, ethylene, an α-olefin, and a nonconjugated polyene. In one embodiment, the "ethylene/α-olefin/nonconjugated polyene interpolymer," comprises a majority weight percent of ethylene (based on the weight of the interpolymer).

The term "ethylene/α-olefin/diene interpolymer," as used herein, refers to a polymer that comprises, in polymerized form, ethylene, an α-olefin, and a diene. In one embodiment, the "ethylene/α-olefin/diene interpolymer," comprises a majority weight percent of ethylene (based on the weight of the interpolymer).

The term "ethylene/α-olefin/diene terpolymer," as used herein, refers to a polymer that comprises, in polymerized form, ethylene, an α-olefin, and a diene, as the only three monomer types. In one embodiment, the "ethylene/α-olefin/diene terpolymer," comprises a majority weight percent of ethylene (based on the weight of the interpolymer).

The term "phr," as used herein, is in reference to weight of a compositional component relative to hundred parts of the one or more ethylene/α-olefin/nonconjugated polyene interpolymers.

The term "parts," in reference to an amount of a component, refers to the weight parts of a component in a composition.

The terms "comprising," "including," "having," and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term, "consisting essentially of" excludes from the scope of any succeeding recitation any other component, step, or procedure, excepting those that are not essential to operability. The term "consisting of" excludes any component, step, or procedure not specifically delineated or listed.

TEST METHODS

MDR—The rate of cure of compounds was measured using the "MDR technique," employing an Alpha Technologies MDR machine. A "30 mm diameter" puck of the uncured sheet, obtained from a roll mill (see experimental section) was placed into the chamber of the MDR machine, and sheet of "100 micron thick" MYLAR film was placed above and below the puck. The chamber was pre-heated to the temperature of the test, which was chosen to be the same as the temperature used to crosslink the compound. The chamber was closed, and the upper die of the MDR oscillated at 1.667 Hertz, and with 0.5° of arc. The torque generated, using a torque transducer on the lower die, was measured. The torque was recorded as a function of time, using the units dNm (deci Newton meters). The time required for the torque to reach 90% and 95% of the value obtained at the end of the test was recorded as the t90 and t95, respectively. This time was used as a guide to the time required to crosslink the compound.

Mooney Viscosity

Mooney viscosity of a first composition was measured according to ASTM 1646-04, using an Alpha-Technologies Mooney Rheometer. A "3 mm thick" sheet was molded from the polymer to be tested, at 180° C., under 5 bar pressure, for 5 minutes, in a compression molding machine. The molded sheet was cooled at 100° C./minute to room temperature. Two "30 mm diameter" discs were cut from the sheet, and a "6 mm hole" was cut in the center of one of the discs. A sheet of MYLAR film of "100 micron thickness" was placed on the lower chamber of the Mooney machine, which was pre-heated to the test temperature (125° C. in this case). The disc with the hole was placed on this sheet of MYLAR film (which also had a hole cut in it), and the large Mooney rotor was placed into the machine. The second disc was placed on top of the rotor, a second sheet of MYLAR film was placed on top of the second disc, and the machine was closed. After a "one minute preheat time," the rotor rotated at 2 rpm for four further minutes. After this time, the torque reading gave the Mooney viscosity as "ML(1+4)125° C." This number is called the "Product Mooney Viscosity".

Mooney viscosity of a compound (formulation) made using a first composition was measured according to ASTM 1646-04, using an Alpha Technologies Mooney Rheometer. Two "30 mm diameter" discs were cut from the sheet of uncured compound obtained from the roll mill (see experimental section), and a "6 mm hole" was cut in the center of one of the discs. A sheet of MYLAR film of "100 micron thickness" was placed on the lower chamber of the Mooney machine, which was pre-heated to the test temperature (100° C. is customarily used for the testing of the Mooney viscosity of formulated compounds). The disc with the hole was placed on this sheet of MYLAR film (which also had a hole cut in it), and the large Mooney rotor was placed into the machine. The second disc was placed on top of the rotor, a second sheet of MYLAR film was placed on top of the second disc, and the machine was closed. After a "one minute preheat time," the rotor rotated at 2 rpm for four further minutes. After this time, the torque reading gave the Mooney viscosity as "ML(1+4)100° C." This number is called the "Compound Mooney Viscosity".

Compound Hardness

Compound hardness was measured to Shore A, according to ISO 868:2003 at 23° C., using a machine manufactured by Zwick Roell (model 7206.07/00). The stylus contacted the cured specimen for three seconds before the reading was taken. The test specimens were cut from the "2 mm thick" cured plaques (see the experimental section). Test sample dimensions were "25 mm×25 mm×2 mm," and the samples were stacked to thickness of "6 mm" for the hardness measurement.

Tensile Properties

Tensile properties were tested according to ISO527, using a Zwick tensile tester, at a crosshead speed of 500 mm/minute and using a 1 kN load cell. Test pieces were cut from the sheet of cured rubber (see experimental section) using a cutter designed to cut out test pieces for the ISO 527 T2 specification.

Gel Permeation Chromatography (GPC)

Polymer molecular weight was characterized by high temperature Triple Detector Gel Permeation Chromatography (3D-GPC). The chromatographic system consisted of a Polymer Laboratories (Amherst, Mass., now part of Varian, Inc, Shropshire, UK) "PL-GPC 210" high temperature chromatograph, or a Polymer Laboratories Model "PL-220," equipped with a concentration detector (RI), a Precision Detectors (Amherst, Mass.) 2-angle laser light scattering detector, Model 2040, and a 4-capillary differential viscometer detector, Model 220, from Viscotek (Houston, Tex.). The 15° angle of the light scattering detector was used for calculation purposes.

Data collection was performed using VISCOTEK TriSEC software, version 3, and a 4-channel VISCOTEK Data Manager DM400. The system was equipped with an on-line ERC-3415α four channel degasser system from ERC Inc (Tokyo, JP). The carousel compartment was operated at 85° C., and the column compartment was operated at 150° C. The columns were four, Polymer Lab Mix-A 30 cm, 20 micron columns. The polymer solutions were prepared 1,2, 4-trichlorobenzene (TCB). The samples were prepared at a concentration of "0.1 grams of polymer in 50 ml of TCB." The chromatographic solvent and the sample preparation solvent contained "200 ppm of butylated hydroxytoluene (BHT)." Both solvent sources were nitrogen purged. Polymer samples were stirred gently at 160° C. for one hour. The injection volume was 200 μl, and the flow rate was 1.0 ml/minute.

Calibration of the GPC column set was performed with 21 narrow molecular weight distribution polystyrene standards. The molecular weights of the standards ranged from 580 to 8,400,000, and were arranged in six "cocktail" mixtures, with at least a decade of separation between individual molecular weights. The polystyrene standard peak molecular weights were converted to polyethylene molecular weights using the following equation (as described in Williams and Ward, J. Polym. Sci., Polym. Let., 6, 621 (1968)): Mpolyethylene=A×(Mpolystyrene)$^B$ (1A), where M is the molecular weight, A has a value of 0.39, and B is equal to 1.0. A fourth order polynomial was used to fit the respective polyethylene-equivalent calibration points.

The total plate count of the GPC column set was performed with EICOSANE (prepared at "0.04 g in 50 milliliters" of TCB, and dissolved for 20 minutes with gentle agitation.) The plate count and symmetry were measured on a 200 microliter injection according to the following equations:

PlateCount=5.54*(RV at Peak Maximum/(Peak width at ½ height))^2     (2A), where RV is the retention volume in milliliters, and the "peak width" is in milliliters.

Symmetry=(Rear peak width at one tenth height−RV at Peak maximum)/(RV at Peak Maximum−Front peak width at one tenth height)     (3A), where RV is the retention volume in milliliters, and the "peak width" is in milliliters.

The Systematic Approach for the determination of multi-detector offsets was done in a manner consistent with that published by Balke, Mourey, et. Al (Mourey and Balke, Chromatography Polym. Chpt 12, (1992)) (Balke, Thitiratsakul, Lew, Cheung, Mourey, Chromatography Polym. Chpt 13, (1992)). Optimizing dual detector log molecular weight results, from a broad polyethylene of 115,000, to the narrow standard column calibration results, from the narrow standards calibration curve, using in-house software. The molecular weight data for off-set determination was obtained in a manner consistent with that published by Zimm (Zimm, B. H., J. Chem. Phys., 16, 1099 (1948)) and Kratochvil (Kratochvil, P., Classical Light Scattering from Polymer Solutions, Elsevier, Oxford, N.Y. (1987)). The overall injected concentration, used for the determination of the molecular weight, was obtained from the sample refractive index increment area, and the RI detector calibration from a linear polyethylene homopolymer of 115,000 Dalton molecular weight. The refractive index increment (dn/dc) for polyethylene is −0.104 mL/g and the dn/dc for EODM is −0.094 mL/g. The chromatographic concentrations were assumed low enough to eliminate addressing 2nd Virial coefficient effects (concentration effects on molecular weight).

The calculations of Mn, Mw, and Mz based on GPC (conventional GPC for Mn, Mw and Mz) results using the RI detector were determined from the following equations:

$$\overline{Mn} = \frac{\sum_i RI_i}{\sum_i (RI_i / M_{calibration_i})}, \quad (4A)$$

$$\overline{Mw} = \frac{\sum_i (RI_i * Mcal_i)}{\sum_i RI_i}, \quad (5A)$$

$$\overline{Mz} = \frac{\sum_i (RI_i * Mcal_i^2)}{\sum_i (RI_i * Mcal_i)}. \quad (6A)$$

Another form of molecular weight average is the viscosity average which can be calculated using Equation 7A:

$$\overline{Mz} = \left( \frac{\sum_i (RI_i * Mcal_i^{\alpha+1})}{\sum_i (RI_i)} \right)^{1/\alpha}, \quad (7A)$$

where α is a material dependent parameter, which relates the intrinsic viscosity ([η]) to the molecular weight of the polymer.

In addition to the above calculations, a set of alternative values [Mw(abs), Mz(abs), Mz (BB) and $M_{Z+1}$(BB)] values were also calculated with the method proposed by Yau and Gillespie, Polymer, 42, 8947-8958 (2001), and determined from the following equations:

$$\overline{Mw}(abs) = K_{LS} * \frac{\sum_i (LS_i)}{\sum_i (IR_i)}, \quad (8A)$$

where, $K_{LS}$=LS-MW calibration constant, $$\overline{Mz}(abs) = \frac{\sum_i RI_i * (LS_i / RI_i)^2}{\sum_i RI_i * (LS_i / RI_i)}, \quad (9A)$$

$$\overline{Mz}(BB) = \frac{\sum_i (LS_i * Mcalibration_i)}{\sum_i (LS_i)}, \quad (10A)$$

$$\overline{M_{Z+1}}(BB) = \frac{\sum_i (LS_i * Mcalibration_i^2)}{\sum_i (LS_i * Mcalibration_i)}, \quad (11A)$$

where $LS_i$ is the 15 degree LS signal, and the Mcalibration uses equation 1A, and the LS detector alignment is as described previously.

In order to monitor the deviations over time, which may contain an elution component (caused by chromatographic changes) and a flow rate component (caused by pump changes), a late eluting narrow peak is generally used as a "flow rate marker peak." A flow rate marker was therefore established based on the air peak in TCB, or a drop of decane flow marker dissolved in the eluting sample prepared in TCB. Flow rate marker was used to linearly correct the flow rate for all samples by alignment of the air peaks or decane peaks. Any changes in the time of the marker peak are then assumed to be related to a linear shift in both flow rate and chromatographic slope.

The plate count for the chromatographic system (based on EICOSANE as discussed previously) should be greater than 22,000, and symmetry should be between 1.00 and 1.12.

The conventional GPC deconvolution algorithm fit the polymer samples with two most probable molecular weight distributions (plus an adjustable error term). In order to account for the variations in the underlying distributions, the basis functions were modified to incorporate a normal distribution term that allows the basis function for each component to be altered to varying degrees along the molecular weight axis. The advantage is that, in the limit, the basis function will become a simple, most probable, Flory distribution.

Three components (j=1,2,3) are derived with the third component (j=3) being an adjustable error term. The molecular weight distribution of the GPC (conventional) was normalized into "weight fraction" versus "Log 10 molecular weight" vectors. Therefore, each potential curve for deconvolution should consist of a height vector, hi, where the heights are reported at known intervals of "Log 10 molecular weight," the hi have been properly transformed from the "elution volume domain" to the "Log 10 molecular weight domain," and the hi are normalized. Each component, j, consists of a most probable, Flory, distribution, which has been convoluted with a normal or Gaussian spreading function using a parameter, σj. The resulting, three basis functions are used in a Chi-square, X2, minimization routine to locate the parameters that best fit the n points in hi, the GPC data vector as follows:

$$X^2(\mu_j, \sigma_j, w_j) =$$

$$\sum_{i=1}^{n} \left[ \sum_{j=1}^{3} \cdot \sum_{k=1}^{20} w_j \cdot M_i^2 \cdot \lambda_{j,k}^2 \cdot CumND_{j,k} \cdot e^{-\lambda_{j,k} \cdot M_i} \cdot \Delta Log_{10}M - h_i \right]^2,$$

$$\lambda_{j,k} = 10^{\mu_j + \frac{k-10}{3} \cdot \sigma_j}$$

where, CumNDj,k, is the normal cumulative distribution function at the following point (x):

x=μj+(k−10)*σj/3, with variables being described in Table 1.

TABLE 1

Description of Coefficients in Equations Describing GPC Deconvolution

| Variable Name | Definition |
|---|---|
| λj, k | Reciprocal of the number average molecular weight of most probable (Flory) distribution for component j, normal distribution slice k |
| σj | Sigma (square root of variance) for normal (Gaussian) spreading function for component j |
| wj | Weight fraction of component j |
| K | Normalization term (1.0/Loge10) |
| Mi | Molecular weight at elution volume slice i |
| hi | Height of log10 (molecular weight) plot at slice i |
| n | Number of slices in Log molecular weight plot |
| i | Log molecular weight slice index (1 to n) |
| j | Component index (1 to 3) |
| k | Normal distribution slice index |
| Δlog10M | Average difference between log10Mi and log10Mi-1 in height vs. log10M plot |

The eight parameters which are derived from the Chi-square minimization are as follows: μ1, μ2, μ3, σ1, σ2, σ3, w1 and w2. The term w3 (error fraction) is subsequently derived from w1 and w2, since the sum of the three components must equal one. The EXCEL application, SOLVER, is used for the minimization procedure, with constraints added to insure proper minimization, as shown in Table 2.

TABLE 2

Constraints used in Minimization Procedure of GPC Deconvolution

| Description | Constraint |
| --- | --- |
| Maximum of fraction 1 | w1 < 0.95 (User adjustable) |
| Lower limit of spreading function | σ1, σ2, σ3 > 0.001 (must be positive) |
| Upper limit of spreading function | σ1, σ2, σ3 < 0.2 (User adjustable) |
| Normalized fractions | w1 + w2 + w3 = 1.0 |

Additional constraints, which are to be understood, include the limitation that only $\mu_j > 0$ are allowed. Also, the wj are all understood to be positive. This constraint can be handled outside of SOLVER. If the wj are understood to arise from the selection of two points along the interval $0.0 < P1 < P2 < 1.0$; whereby w1=P1, w2=P2−P1 and w3=1.0−P2; then constraining P1 and P2 are equivalent to the constraints required above for the wj. To obtain an optimum curvature matrix for the fit, the following options were set in Solver—see Table 3.

TABLE 3

SOLVER Options used for GPC Deconvolution

| Label | Value or selection |
| --- | --- |
| Max Time (seconds) | 1000 |
| Iterations | 100 |
| Precision | 0.000001 |
| Tolerance (%) | 5 |
| Convergence | 0.001 |
| Estimates | Tangent |
| Derivatives | Forward |
| Search | Newton |
| ALL OTHER SELECTIONS | Not selected |

A first estimate for the values of $\mu_1$, $\mu_2$, w1, and w2 can be obtained by assuming two ideal Flory components that give the observed weight average, number average, and z-average molecular weights for the observed GPC distribution. Then $\mu_1$, $\mu_2$, w1, and w2 are solved for allowing a small error term, w3, and meeting the constraints given previously before entering into SOLVER for the minimization step. Starting values for σj are all set to 0.05.

FTIR—Ethylene and ENB levels were measured according to ASTM D6047-99.

Density—Density is measured in accordance with ASTM D-792.

Melt Index—Melt index ($I_2$) for the ethylene-based polymers, in g/10 min, was measured using ASTM D-1238 (Condition 190° C./2.16 kg). The notation "I5" refers to a melt index, in g/10 min, measured using ASTM D-1238, Condition 190° C./5.0 kg. The notation "I10" refers to a melt index, in g/10 min, measured using ASTM D-1238, Condition 190° C./10.0 kg. The notation "I21" refers to a melt index, in g/10 min, measured using ASTM D-1238, Condition 190° C./21.6 kg. For propylene-based polymers, the melt flow rate (MFR) was measured using ASTM D-1238-04 (Condition 230° C./2.16 kg).

Experimental

Figure 1:
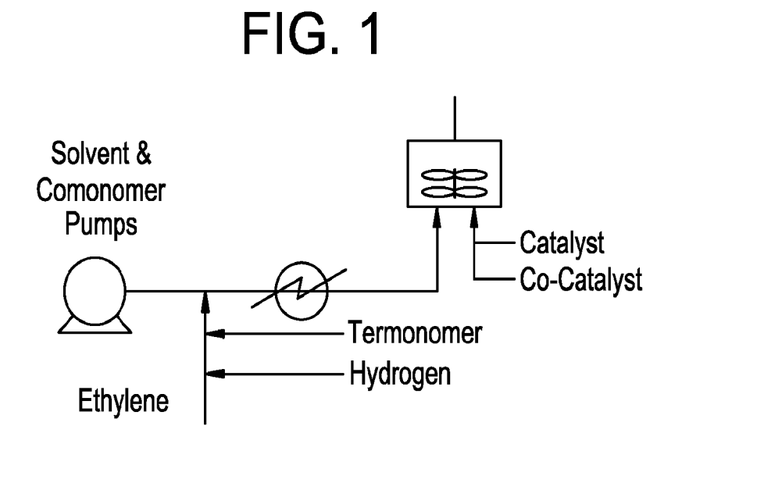
FIG. 1 depicts a flow diagram for an inventive polymerization process.

Inventive EPDMs—A single one gallon autoclave, continuously stirred tank reactor (CSTR) was used to prepare the polymer composition (first composition). The CSTR has a single, magnetically coupled agitator with "3 inch" A320 impellers, which provided mixing in the reactor. This agitator was controlled at 1000 rpm for all of the polymerization runs. The reactor pressure was controlled at 525 psig, and a constant temperature was maintained inside the reactor by flowing SYLTHERM 800 heat transfer fluid through the jacket of the reactor. FIG. 1 is a process flow diagram of the polymerization.

Each catalyst was diluted in an inert atmosphere glove box. The catalyst solutions were then transferred over into catalyst and cocatalyst vessels. The catalyst package included "zirconium, dimethyl[[2,2′′′-[1,3-propanediylbis(oxy-κO)]bis[3′′,5,5′′-tris(1,1-dimethylethyl)-5′-methyl[1,1′:3′,1′′-terphenyl]-2′-olato-κO]](2-)]-(OC-6-33)-" (CAT-1) or "hafnium, dimethyl[[2,2′′′-[1,3-propanediylbis(oxy-kO)]bis [3-(9H-3,6-(1,1-dimethylethyl)-carbazol-9-yl)-5′-fluoro-5-(1,1,3,3-tetramethylbutyl)-[1,1′-biphenyl]-2-olato-kO]](2-)]" (CAT-6), each as the primary catalyst (HMW CAT); and one of "hafnium, dimethyl[[2,2′′′-[1,2-ethanediylbis(oxy-kO)]bis[3-(9H-carbazol-9-yl)-5-methyl-[1,1′-biphenyl]-2-olato-kO]](2-)]-" (CAT-2), "hafnium, dimethyl[[2,2′′′-[1,2-ethanediylbis(oxy-kO)]bis[3-(9H-3,6-(1,1-dimethylethyl)-carbazol-9-yl)-5-(1,1,3,3-tetramethylbutyl)-[1,1′-biphenyl]-2-olato-kO]](2-)]-" (CAT-3), "hafnium, dimethyl[[2,2′′′-[1,2-ethanediylbis(oxy-kO)]bis[3-(9H-3,6-(1,1-dimethylethyl)-carbazol-9-yl)-5′-fluoro-5-(1,1,3,3-tetramethylbutyl)-[1,1′-biphenyl]-2-olato-kO]](2-)]-" (CAT-4), or "hafnium, dimethyl[[2,2′′′-[1,2-ethanediylbis(oxy-kO)]bis[3-(9H-3,6-(1,1-dimethylethyl)-carbazol-9-yl)-5′-chloro-2′-methyl-5-(1,1,3,3-tetramethyl-butyl)-[1,1′-biphenyl]-2-olato-kO]](2-)]-" (CAT-5). The CAT-2 to CAT-5 each served as a secondary catalyst (LMW CAT). The [bis(hydrogenated tallowalkyl)methyl-ammonium tetrakis (pentaflurophenyl)borate] (co-cat 1) served as the primary co-catalyst, and MMAO (modified methyl aluminoxane) served as the secondary co-catalyst. The co-catalysts (MMAO and co-cat 1) were prepared in a separate run vessels, and then mixed before entering into the reactor.

The catalysts and co-catalysts were fed into separate injectors. Primary catalyst and secondary catalyst were fed together into the catalyst injector at a specified molar ratio, while MMAO and co-cat 1 were fed into the co-catalyst injector. The feed containing hydrogen, ethylene as the monomer, propylene as the comonomer, ENB as the termonomer, and ISOPAR E as the solvent, were combined, and fed into the bottom of the reactor.

The reaction temperature, ratio of the two catalysts, and conversion level were varied, and are shown in Tables 4 and 5 below. The feeds of the ethylene, propylene and ENB monomers, as well as hydrogen, were controlled to produce, in the composition, an overall ethylene content around 70-72 weight percent, based on weight of final polymer, and an ENB content around 4-6 weight percent, based on weight of the final polymer. The overall product viscosity was around 40 (ML(1+4)125° C.).

Figure 2:
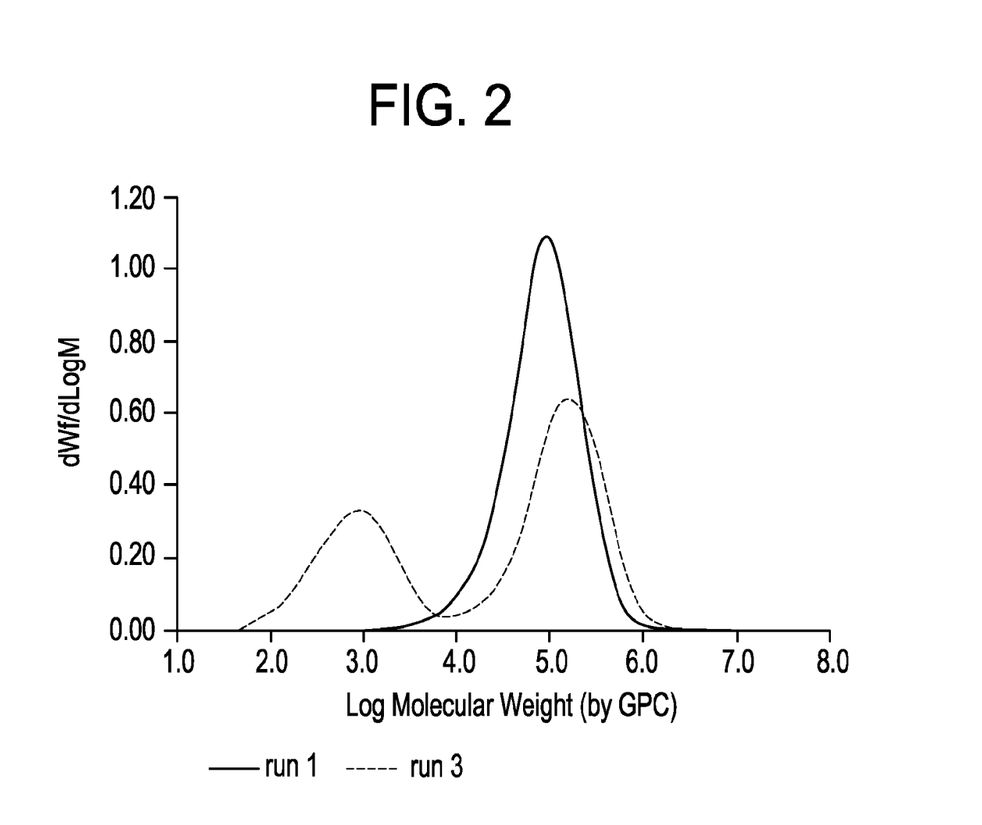
FIG. 2 depicts the GPC profiles for polymerizations Run 1 and Run 3.

Representative polymerization Run 3 was conducted at a reactor temperature of 130° C. and pressure of 525 psig. Ethylene was feed to the continuous stirred tank reactor at 2.74 lb/hr, with "3.38 lb/hr propylene" and "0.24 lb/hr ENB," all dissolved in "36 lb/hr solvent." Hydrogen was also feed into the reactor around 2 sccm (standard cubic centimeter). The CAT-1 and CAT-3 were then feed to reactor together, and lined out (steady state) at 0.28 lb/hr and 0.30 lb/hr, respectively, to maintain the reactor exit ethylene conversion at about 85 percent. Polymerization Runs 4-6 were run under similar conditions with noted changes shown in Table 4. The comparative polymerization (run 1) was run under similar polymerization conditions, except no "LMW CAT" was added to the reactor. GPC curves comparing run 1 (comparative) and 3 (inventive) are shown in FIG. 2.

TABLE 4

Polymerization Data Summary for Runs 1, 3, 4, 5 and 6

| Run # | 1 | 3 | 4 | 5 | 6 |
|---|---|---|---|---|---|
| Mooney (MU) | 39.1 | 37.0 | 38.2 | 36.6 | 38.7 |
| FTIR C2 (weight percent, based on weight of polymer) | 71.3 | 71.0 | 71.3 | 70.7 | 70.1 |
| FTIR C3 (weight percent, based on weight of polymer) | 23.7 | 24.6 | 23.3 | 23.9 | 25.3 |
| FTIR ENB (weight percent, based on weight of polymer) | 4.97 | 4.57 | 5.33 | 5.38 | 4.62 |
| Primary Reactor Temperature [C.] | 130 | 130 | 170 | 170 | 130 |
| Primary Reactor Pressure [psig] | 525 | 525 | 525 | 525 | 525 |
| Primary Reactor Monomer How [lb/hr] | 2.74 | 2.74 | 2.74 | 2.74 | 2.74 |
| Primary Reactor Comonomer How [lb/hr] | 3.38 | 3.38 | 3.38 | 3.38 | 3.38 |
| Primary Reactor Termonomer Flow [lb/hr] | 0.24 | 0.24 | 0.24 | 0.24 | 0.24 |
| Primary Reactor Feed Solvent/Monomer Weight Ratio | 15.14 | 15.36 | 15.20 | 15.25 | 15.20 |
| Primary Reactor Total Comonomer/Monomer weight Ratio | 55.25 | 55.14 | 55.23 | 55.17 | 55.22 |
| Primary Reactor Hydrogen Mole % (based on molar amount ethylene fed to reactor) [MOLE %] | 0.04 | 0.01 | 0.01 | 0.01 | 0.03 |
| Primary Reactor Hydrogen flow [sccm] | 7.03 | 2.29 | 0.92 | 0.98 | 5.03 |
| Primary Reactor LOG of Viscosity [Log(cP)] | 1.48 | 1.31 | 1.20 | 1.21 | 1.49 |
| FTNIR EXIT MONOMER CONC corrected [g/l] | 5.04 | 5.45 | 5.33 | 5.07 | 4.94 |
| VENT MONOMER CONVERSION [%] | 86.52 | 85.11 | 85.46 | 86.08 | 86.87 |
| FTNIR R-21 EXIT COMONOMER RAW CONC [G/L] | 46.35 | 47.01 | 43.25 | 41.80 | 45.24 |
| Primary Reactor Production Rate (lb/hr) | 3.03 | 4.81 | 3.04 | 3.11 | 3.14 |
| Primary Reactor Catalyst Efficiency (MM lb PE/lb Cat.) | 3.3 | 1.23 | 1.1 | 1.0 | 1.1 |
| Primary Reactor Solids [wt %] | 6.87 | 10.72 | 6.83 | 6.96 | 7.06 |
| LMW CAT METAL MOLE % [mol %] | 0.00 | 79.81 | 38.74 | 32.90 | 46.14 |
| HMW CAT MOLAR FLOW 1000 [umol/hr] | 4.64 | 2.23 | 6.38 | 7.68 | 5.36 |
| LMW CAT MOLAR FLOW 1000 [umol/hr] | 0.00 | 8.75 | 4.01 | 3.82 | 4.57 |
| HMW CAT MASS FLOW RATE 10 [lbs/hr] | 0.19 | 0.28 | 0.39 | 0.47 | 0.33 |
| LMW CAT MASS FLOW RATE 10 [lbs/hr] | 0.00 | 0.30 | 0.15 | 0.12 | 0.12 |
| Catalyst molar ratio (LMW CAT/HMW CAT) | | 0.25 | 1.59 | 2.01 | 1.17 |

Product viscosity (see Table 5) is the Mooney viscosity of the first composition containing the two polymer components. The molecular weight of the high molecular weight polymer was adjusted to obtain the required overall viscosity.

As shown in Table 5, compositions were made with a weight fraction of the low molecular weight polymer from 14 to 41 weight percent (based on the weight of the first composition). The weight average molecular weight of the low molecular weight polymer was around 1000-1200 g/mole. The resultant compositions had molecular weight distributions (Mw/Mn) of at least 50, and in some cases over 100. In comparison, a traditional polymer composition with a broad molecular weight distribution is often said to be present a molecular weight distribution around 5.

TABLE 5

Properties of the First Composition (EPDMs)

| Run | 1 (Comp.) | 3 | 4 | 5 | 6 |
|---|---|---|---|---|---|
| Product Viscosity | 40MU | 40MU | 40MU | 40MU | 40MU |
| Molar Ratio of catalysts (HMW CAT to LMW CAT) | 1:0 | 1:4 | 2:1 | 2:1 | 1:4 |
| LMW CAT | na | CAT-3 | CAT-3 | CAT-4 | CAT-4 |
| HMW CAT | CAT-1 | CAT-1 | CAT-1 | CAT-1 | CAT-1 |
| Low molecular weight polymer | | | | | |
| LMW Polymer Wt % (based on weight of first composition)* | 0 | 41 | 14 | 14 | 19 |
| Mn | | 530 | 500 | 550 | 510 |
| Mw | | 1,180 | 1,020 | 1,070 | 1,170 |
| Mz | | 2,100 | 1,800 | 1,900 | 2,100 |
| Mw/Mn | | 2.23 | 2.04 | 1.95 | 2.29 |
| High molecular weight polymer | | | | | |
| Mn | 51,650 | 96,160 | 62,510 | 61,290 | 66,450 |
| Mw | 123,470 | 204,250 | 142,950 | 137,650 | 147,130 |
| Mz | 236,300 | 357,100 | 280,300 | 261,500 | 283,700 |
| Mw/Mn | 2.39 | 2.12 | 2.29 | 2.25 | 2.21 |
| First Composition (overall blend) | | | | | |
| Mn | 51,650 | 1,300 | 2,150 | 2,030 | 1,990 |
| Mw | 123,470 | 133,390 | 109,750 | 110,540 | 112,900 |
| Mz | 236,300 | 404,700 | 264,000 | 285,500 | 283,400 |
| Mw/Mn | 2.39 | 102.61 | 51.05 | 54.45 | 56.73 |

*Determined by GPC Deconvolution

Inventive Ethylene/Octene Copolymers

A similar set of compositions were made using ethylene and octene as the monomer, and comonomer, respectively. See Table 6. For each polymerization, monomer flows were controlled to obtain an overall composition of 67 weight percent ethylene and 33 weight percent octene, each based on weight of polymer. The viscosity of the overall blend (first composition) was controlled to obtain a melt index of 1 g/10 min. Properties of the compositions are shown in Table 7.

Representative polymerization Run 10 was conducted at a reactor temperature of 130° C. and a pressure of 525 psig. Ethylene was feed to the continuous stirred tank reactor at 4.39 pounds per hour, with a comonomer/olefin ratio of 60.7, and a "solvent to ethylene" ratio around 12. Hydrogen was also feed into the reactor at "0.14 mole percent" to ethylene feed. The "zirconium, dimethyl[[2,2'''-[1,3-propanediylbis (oxy-κO)]bis[3'',5,5''-tris(1,1-dimethylethyl)-5'-methyl[1,1': 3',1''-terphenyl]-2'-olato-κO]](2-)]-, (OC-6-33)-" (CAT-1) was used as the primary catalyst, and was feed to the reactor at 40 mole percent, to maintain the reactor exit concentration around 6 gram per liter. Polymerization Runs 11-14 and 16-17 were run under similar conditions with noted changes shown in Table 6. The comparative polymerizations (Run 9 and Run 15) were run under similar polymerization conditions, except no "LMW CAT" was added to the reactor. Properties are shown in Table 7.

Figure 3:
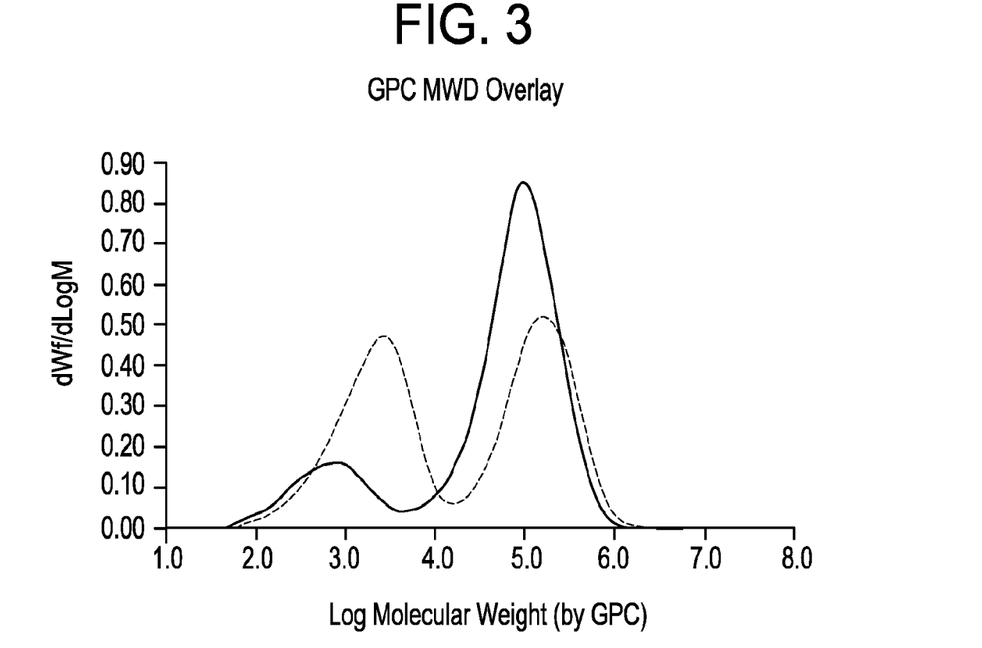
FIG. 3 depicts the GPC profiles for polymerization Run 4 and polymerization Run 12.
Figure 4:
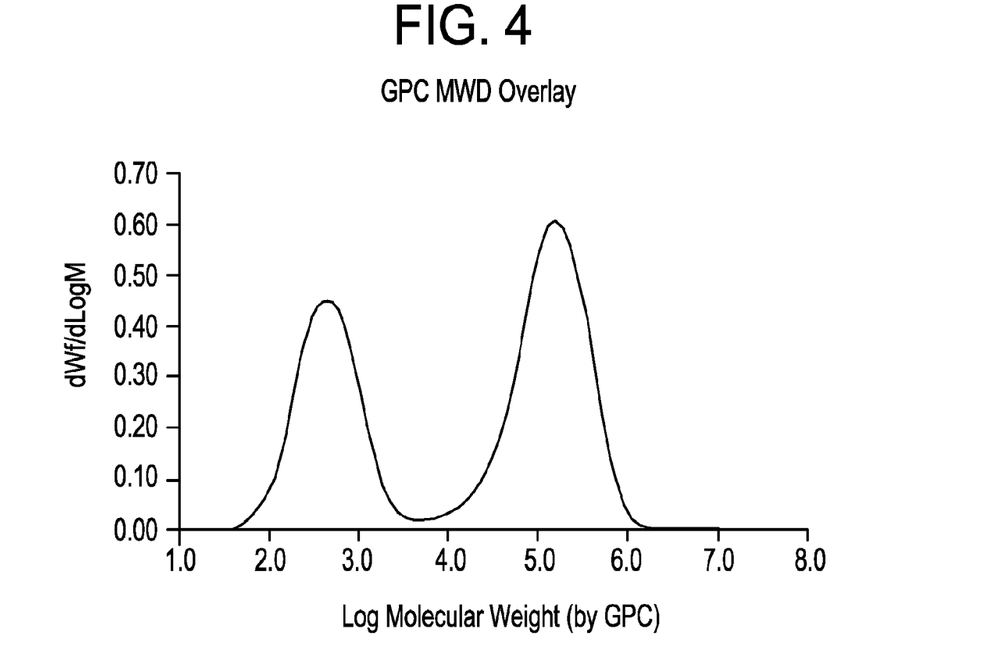
FIG. 4 depicts the GPC profile for polymerization Run 14.

As shown in Table 7, the low molecular weight polymers from 26.2 to 67.3 weight percent were obtained. The low molecular weight polymers had weight average molecular weights (Mw) from 570 to 3250 g/mole. The MWD of the compositions ranged from 47 to 144. The GPC profiles for Run 4 (see Table 5) and Run 12 (see Table 6) are shown in FIG. 3. The GPC profile of Run 14 (see Table 6) is shown in FIG. 4.

TABLE 6

Polymerization Data Summary for Runs 9-17

| | Run # | | | | | | | | |
|---|---|---|---|---|---|---|---|---|---|
| | 9 | 10 | 11 | 12 | 13 | 14 | 15 | 16 | 17 |
| Reactor Temperature [° C.] | 130 | 130 | 130 | 130 | 130 | 130 | 130 | 131 | 150 |
| Primary Reactor Pressure [psig] | 525 | 525 | 525 | 525 | 525 | 525 | 525 | 525 | 525 |
| Primary Reactor Monomer flow [lb/hr] | 4.37 | 4.39 | 4.37 | 4.38 | 4.37 | 4.37 | 4.44 | 4.46 | 3.41 |
| Primary Reactor Feed Monomer/Solvent Ratio | 11.88 | 12.14 | 12.01 | 11.97 | 11.94 | 11.95 | 11.33 | 11.48 | 9.43 |
| Primary Reactor Octene/Olefin Ratio | 60.76 | 60.66 | 60.69 | 60.67 | 60.76 | 60.74 | 54.87 | 55.36 | 61.27 |
| Primary Reactor Mole percent [%] | 0.27 | 0.16 | 0.12 | 0.13 | 0.14 | 0.11 | 1.02 | 0.11 | 0.06 |
| Primary Reactor Hydrogen Flow [sccm] | 1.66 | 1.56 | 1.52 | 1.54 | 1.47 | 1.49 | 1.71 | 1.51 | 1.47 |
| Primary LOG of Viscosity [Log (cP)] | 7.46 | 6.47 | 7.76 | 7.71 | 7.67 | 7.66 | 7.33 | 7.18 | 12.03 |
| Reactor FTnIR Exit Monomer Conc. corrected [g/l] | 84.74 | 86.60 | 83.77 | 84.16 | 84.38 | 84.32 | 85.39 | 85.53 | 79.06 |
| Primary Reactor Vent Monomer Conversion [%] | 51.08 | 47.41 | 51.71 | 48.90 | 57.64 | 59.62 | 32.20 | 35.04 | 61.58 |
| Primary Reactor FTnIR Exit Comonomer RAW Conc. [G/L] | 5.44 | 6.11 | 5.58 | 5.72 | 4.91 | 4.93 | 6.05 | 5.85 | 4.17 |
| Primary Reactor Production Rate [lb/hr] | 9.65 | 10.63 | 9.84 | 10.08 | 8.69 | 8.73 | 11.00 | 10.52 | 11.78 |
| Primary Reactor Catalyst Efficiency (MM lb PE/lb Cat.) | 5.6 | 1.0 | 1.97 | 1.8 | 3.4 | 3.2 | 4.7 | 3.4 | 6.9 |
| Primary Reactor Solids (wt %) | 9.65 | 10.63 | 9.84 | 10.08 | 8.69 | 8.73 | 11.00 | 10.52 | 11.78 |
| Reactor Catalyst-2 metal mole percent [mol %] | 0.00 | 60.30 | 60.14 | 59.89 | 11.08 | 15.09 | 0.00 | 80.02 | 80.24 |
| R-21 Catalyst-1 molar flow [umol/hr] | 4.87 | 7.64 | 3.48 | 4.18 | 5.84 | 5.62 | 3.31 | 0.90 | 0.30 |
| R-21 Catalyst-2 molar flow [umol/hr] | 0.00 | 11.63 | 5.28 | 6.18 | 0.73 | 1.00 | 0.00 | 3.55 | 1.23 |
| D-31 Catalyst mass flow rate [lbs/hr] | 0.12 | 0.19 | 0.09 | 0.10 | 0.15 | 0.14 | 0.00 | 0.22 | 0.15 |
| D-31B Catalyst mass flow rate [lbs/hr] | 0.00 | 0.39 | 0.18 | 0.21 | 0.09 | 0.13 | 0.12 | 0.20 | 0.13 |
| Soft/hard Catalyst ratio | 0.00 | 1.51 | 1.51 | 1.50 | 0.13 | 0.18 | 0.00 | 3.94 | 3.99 |

TABLE 7

Properties of First Composition

| | Run | | | | | | | | |
|---|---|---|---|---|---|---|---|---|---|
| | 9 | 10 | 11 | 12 | 13 | 14 | 15 | 16 | 17 |
| Ethylene wt % in firstcomp (FTIR) | 67 | 67 | 67 | 67 | 67 | 67 | 67 | 67 | 67 |
| octene wt % in firstcomp (FTIR) | 33 | 33 | 33 | 33 | 33 | 33 | 33 | 33 | 33 |
| Product melt index (I2) g/10 min | 1MI | 1MI | 1MI | 1MI | 1MI | 1MI | 1MI | 1MI | 1MI |
| Notes | | | | | | | [c2] = 7.4 g/l | [c2] = 20 g/l | |
| Molar Ratio (HMW cat to LMW cat) | 1:0 | 2:1 | 2:1 | 2:1 | 2:1 | 2:2 | | 1:4 | 1:4 |
| LMW Cat | na | CAT-2 | CAT-3 | CAT-4 | CAT-5 | CAT-5 | na | CAT-4 | CAT-4 |
| HMW Cat | CAT-1 | CAT-1 | CAT-1 | CAT-1 | CAT-1 | CAT-1 | CAT-6 | CAT-6 | CAT-6 |
| Wt % of LMWpolymer* | 0 | 35.1 | 41.1 | 50.4 | 26.2 | 39.2 | | 67.3 | 65.9 |

TABLE 7-continued

Properties of First Composition

| | Run | | | | | | | | |
|---|---|---|---|---|---|---|---|---|---|
| | 9 | 10 | 11 | 12 | 13 | 14 | 15 | 16 | 17 |
| low molecular weight polymer component | | | | | | | | | |
| Mn | na | 1,020 | 1,040 | 1,060 | 320 | 310 | | 1,340 | 1,020 |
| Mw | na | 2,730 | 2,290 | 2,820 | 580 | 570 | | 3,250 | 2,590 |
| Mz | na | 5,100 | 4,000 | 5,100 | 1,000 | 1,000 | | 6,100 | 4,700 |
| Mw/Mn | na | 2.68 | 2.20 | 2.66 | 1.81 | 1.84 | | 2.43 | 2.54 |
| high molecular weight polymer component | | | | | | | | | |
| Mn | 41,870 | 71,180 | 86,770 | 102,810 | 70,140 | 85,100 | 42,760 | 200,640 | 225,500 |
| Mw | 100,680 | 139,070 | 179,350 | 205,700 | 157,690 | 201,480 | 109,300 | 436,410 | 509,770 |
| Mz | 180,500 | 246,800 | 363,900 | 355,600 | 281,700 | 357,700 | 210,100 | 766,600 | 953,200 |
| Mw/Mn | 2.40 | 1.95 | 2.07 | 2.00 | 2.25 | 2.37 | 2.56 | 2.18 | 2.26 |
| first composition | | | | | | | | | |
| Mn | | 2,090 | 1,710 | 2,230 | 1,110 | 820 | | 1,750 | 1,590 |
| Mw | | 97,360 | 102,730 | 112,020 | 107,880 | 118,020 | | 151,060 | 174,030 |
| Mz | | 353,700 | 448,900 | 500,400 | 291,000 | 356,900 | | 845,600 | 943,900 |
| Mw/Mn | | 47 | 60 | 50 | 97 | 144 | | 86 | 109 |

*Determined by GPC Deconvolution - based on weight of first composition

It has been discovered that the inventive compositions (see Tables 5 and 7) can be made in a single reactor using a mixture of catalysts, or in parallel or series reactors. The polymer components are therefore blended, while the polymers are still in solution, enabling intimate molecular mixing of the polymers. The incorporation of a low molecular weight polymer decreases the viscosity of the composition after removal of the solvent, compared to the viscosities of compositions with similar molecular weight of the high molecular weight polymer component. The decreased viscosity of the inventive composition facilitates processing of the composition in subsequent processes, where shearing of the composition is required. Also, in the inventive examples (see Tables 5 and 7), the low molecular weight interpolymers had weight average molecular weights less than 5000 g/mole, as measured by conventional GPC, and thus, these polymers are able to act as a plasticising agents in the polymer composition. The overall molecular weight distributions of the first compositions were very broad.

Comparison of Mechanical Properties

It has been discovered that the inventive compositions have improved properties compared to single-polymer compositions of the same viscosity. In this study, the properties of the polymers from three polymerization runs (Runs 18-20) were compared. Different ratios of the high and low molecular weight catalysts were used, to compare compositions containing no low molecular weight polymer, with compositions containing low molecular weight polymer at 10 weight percent and 15 weight percent, each based on the weight of the first composition. The overall Mooney viscosities of these three compositions were about the same. Polymer compositions (EPDMs) are shown in Tables 8A and 8B. The comparative polymerization (run 18) was run under similar polymerization conditions, except no "LMW CAT" was added to the reactor.

TABLE 8A

| EPDM Polymerizations | | | |
|---|---|---|---|
| Polymerization Run | 18 (Comp.) | 19 | 20 |
| High molecular weight catalyst | CAT-1 | CAT-1 | CAT_1 |
| Low molecular weight catalyst | — | CAT-2 | CAT-2 |

TABLE 8A-continued

| EPDM Polymerizations | | | |
|---|---|---|---|
| Polymerization Run | 18 (Comp.) | 19 | 20 |
| Molar ratio of high molecular weight catalyst to low molecular weight catalyst | — | 4:1 | 3:2 |
| Polymer Mooney (ML(1 + 4)125° C.) | 37.3 | 37.0 | 31.4 |
| FTIR C2 (wt %, based on weight of polymer) | 71.2 | 71.5 | 71.3 |
| FTIR C3 (wt %, based on weight of polymer) | 23.4 | 23.0 | 23.6 |
| FTIR ENB (wt %, based on weight of polymer) | 5.2 | 5.5 | 5.1 |
| Wt % low molecular weight polymer (based on weight of first comp.)* | 0 | 10 | 15 |
| Mw/Mn of composition | 3.2 | 37.1 | 15.8 |
| Mw overall | 125640 | 110500 | 110140 |
| Mw high molecular weight | 125640 | 117260 | 120060 |
| Mw low molecular weight | — | 790 | 1310 |
| Reactor temperature, ° C. | 125 | 125 | 125 |
| Reactor pressure (psig) | 525 | 525 | 525 |
| monomer flow, pounds per hour | 2.74 | 2.74 | 2.73 |
| solvent/monomer ratio | 15.0 | 15.0 | 15.0 |
| comonomer/monomer weight ratio | 55.2 | 55.2 | 55.2 |
| hydrogen concentration, mol %, based on total mole of ethylene added to reactor | 0.05 | 0.04 | 0.04 |
| hydrogen flow sccm | 8.20 | 7.48 | 7.48 |
| log viscosity at exit (Log(cP)) | 1.5 | 1.4 | 1.3 |

*Determined by GPC Deconvolution

TABLE 8B

| EPDM Polymerizations Continued | | | |
|---|---|---|---|
| Polymerization Run | 18 (Comp.) | 19 | 20 |
| monomer concentration at exit, g/l | 4.2 | 5.1 | 4.9 |
| monomer conversion, % | 89.1 | 86.2 | 87.1 |
| comonomer concentration at exit, g/l | 46.5 | 47.6 | 46.5 |
| production rate, lb/hr | 3.2 | 3.1 | 3.1 |
| catalyst efficiency (MM lb PE/lb Cat.) | 1.0 | 0.9 | 0.6 |

TABLE 8B-continued

EPDM Polymerizations Continued

| Polymerization Run | 18 (Comp.) | 19 | 20 |
|---|---|---|---|
| reactor solids, wt %, based on total feed | 7.4 | 7.1 | 7.0 |
| flow ratio of catalyst 2, molar ratio in % | 0.0 | 20.0 | 40.0 |
| HMW CAT molar flow 1000 [umol/hr] | 16.0 | 12.3 | 12.0 |
| LMW CAT molar flow 1000 [umol/hr] | 0.0 | 3.1 | 8.0 |
| LMW CAT mass flow rate 10 [lbs/hr] | 0.00 | 0.12 | 0.32 |
| HMW CAT mass flow rate 10 [lbs/hr] | 0.47 | 0.38 | 0.33 |
| catalyst flow rate ratio by mass (LMW CAT/HMW CAT) | | 4.02 | 1.50 |
| HMW Mn | 39300 | 46020 | 48950 |
| HMW Mw | 125640 | 117260 | 120060 |
| HMW MWD | 3.2 | 2.6 | 2.5 |
| LMW Mn | — | 180 | 680 |
| LMW Mw | — | 790 | 1310 |
| LMW MWD | — | 4.4 | 1.9 |
| Overall (First Composition) Mn | 39300 | 2980 | 6960 |
| Overall (First Composition) Mw | 125640 | 110500 | 110140 |
| Overall (First Composition) MWD | 3.2 | 37 | 16 |

Figure 5:
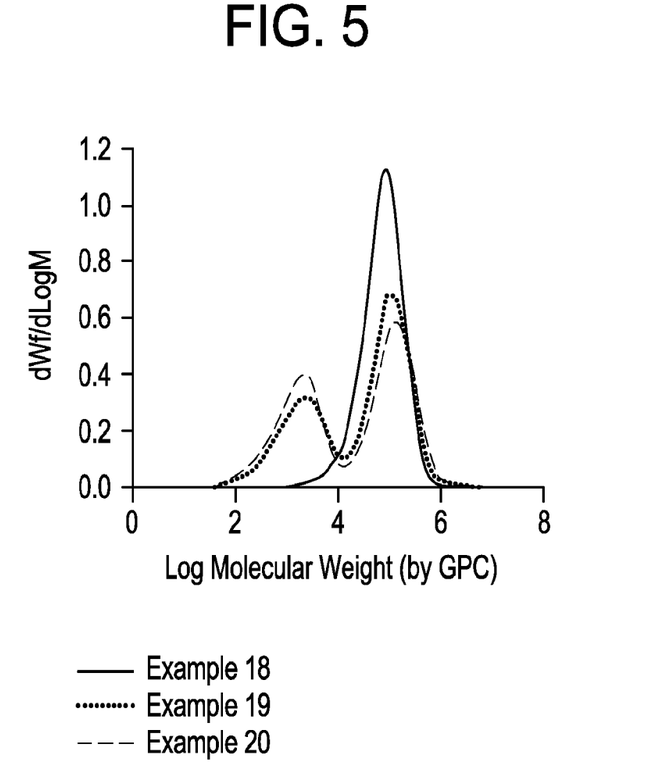
FIG. 5 depicts the GPC profiles for polymerization Runs 18-19.

The GPC profiles of the compositions (Runs 18-20) are shown in FIG. 5. It is seen that the high molecular weight polymers of the three compositions have similar GPC profiles. As discussed above, the amount of low molecular weight polymer varies between the three compositions.

Each compositions was compounded and crosslinked to make a standard peroxide-cured compound. Resin formulations are shown in Table 9. The units are "parts per hundred of rubber," which is refers to parts per hundred of the high molecular weight polymer, so that each compound (formulation) contains the same amount of the high molecular weight polymer. Some mechanical properties of the crosslinked compositions were tested.

Compounds (formulations) were prepared in an internal mixer with a "1.5 liter" volume. The temperature of the water in the heating jacket of the mixing chamber was 50° C. All components were added at once, and mixed at varying rpm, to allow the formulation temperature to reach 95° C. The ram was lifted, swept, and re-lowered, and the compound mixed for a further 60 seconds. After this time, the door below the mixer was opened to release the uncured compound into a receptacle.

Sheets of uncured compound approximately "5 mm" thick were obtained by passing the compound (obtained from the internal mixer) between the rolls of a two-roll mill, with rolls of dimensions "300 mm×150 mm." The temperature of the water within the rolls was maintained at 60° C., and the roll speed was 20 rpm.

Plaques of crosslinked compound, for mechanical property testing, were obtained by crosslinking each compound in a compression molding press. About "75 cc" of the uncured sheet, taken from the roll mill, was placed into a mold form of dimensions "15 cm by 15 cm by 2 mm." The mold was closed with a pressure of 50 bar, at 180° C., for a time of t90+3 minutes, where t90 is the time to reach 90% cure, as measured using an Alpha Technologies MDR, according to ISO6502 at 180° C. Properties of the crosslinked compositions are shown in Table 9.

TABLE 9

Formulations and Properties

| | Comp. 18 | Ex. 19 | Ex. 20 |
|---|---|---|---|
| Wt % low molecular weight polymer, based on weight of first composition Compound (formulation) | 0 | 10 | 15 |
| Polymer composition from reactor | 100 | 110 | 115 |
| process oil SUNPAR 2280 | 70 | 60 | 55 |
| Polymerized 1,2-dihydro-2,2,4-trimethylquinoline antioxidant | 1 | 1 | 1 |
| N,N'-phenylene bismaleimide crosslinking coagent | 1 | 1 | 1 |
| carbon black N650 | 115 | 115 | 115 |
| Dicumyl peroxide, 40% on clay, parts active | 8 | 8 | 8 |
| Compound (Formulation) Mooney Viscosityy | 44 | 58 | 54 |
| MDR t95, minutes plus seconds | 15 minutes 40 seconds | 16 minutes 25 seconds | 15 minutes 35 seconds |
| Shore A Hardness, 3s | 72 | 76 | 76 |
| Modulus at 100% extension, MPa | 4.7 | 5.6 | 5.6 |
| Tensile strength at break, MPa | 12.7 | 14.3 | 13.9 |
| % elongation at break | 311 | 286 | 292 |

It has been discovered that, despite the similar Mooney viscosities of the three compositions (Runs 18-20), the crosslinked samples formed from the inventive compositions have better modulus and tensile strength at break, as shown in Table 9.

The invention claimed is:

1. A composition comprising a first composition comprising the following:
A) a first ethylene/propylene/non-conjugated diene interpolymer (EPDM(1)) that has a weight average molecular weight (Mw) greater than 90,000 g/mole and a MWD from 2.12 to 2.29, each as determined by conventional GPC;
B) a second ethylene/propylene/non-conjugated diene interpolymer (EPDM(2)) that has a weight average molecular weight (Mw) less than, or equal to, 4000 g/mole and a MWD from 1.95 to 2.29; and
wherein the first composition has a number average molecular weight (Mn) less than 10,000 g/mole as determined by conventional GPC; and
wherein the weight ratio of the component A) to the component B) is from 8/2 to 1/1; and
wherein the first composition has a weight average molecular weight (Mw) greater than, or equal to, 100,000 g/mole; and
wherein the first composition has a density from 0.855 g/cc to 0.910 g/cc, and a melt index (I2) less than, or equal to, 10 g/10 min; and
wherein the weight ratio of the ethylene content in the second ethylene/propylene/non-conjugated diene interpolymer to the ethylene content in the first ethylene/propylene/non-conjugated diene interpolymer (EE(2)/EE(1)) is from 0.90 to 1.10, and wherein the absolute difference in the propylene content of the first ethylene/propylene/non-conjugated diene interpolymer and the second ethylene/propylene/non-conjugated diene interpolymer is less than 5 weight percent, wherein each weight percent is based on the weight of the respective interpolymer; and wherein the first composition has a MWD greater than, or equal to, 50, and less than, or equal to, 200.

2. The composition of claim 1, wherein the components A) and B) comprise greater than, or equal to, 80 weight percent of the first composition, based on the weight of the first composition.

3. The composition of claim 1, wherein the ratio of the weight average molecular weight of the first ethylene/propylene/non-conjugated diene interpolymer to the weight average molecular weight of the second ethylene/propylene/non-conjugated diene interpolymer, Mw(first)/Mw(second), is greater than 100, as determined by conventional GPC.

4. The composition of claim 1, wherein the first ethylene/propylene/non-conjugated diene interpolymer and the second ethylene/propylene/non-conjugated diene interpolymer are prepared sequentially in one reactor.

5. The composition of claim 1, wherein the composition has a Mooney Viscosity (MV 1+4 (125° C.)) from 20 to 100.

6. The composition of claim 1, further comprising at least one additive.

7. An article comprising at least one component formed from the composition of claim 1.

8. The composition of claim 1, wherein the first composition has the weight average molecular weight (Mw) greater than, or equal to, 120,000 g/mole.

9. The composition of claim 1, wherein the first composition has the Mn less than, or equal to, 7,000 g/mole, as determined by conventional GPC.

10. The composition of claim 1, wherein the first composition has the Mn less than, or equal to, 5,000 g/mole, as determined by conventional GPC.

11. The composition of claim 1, wherein the first ethylene/propylene/non-conjugated diene interpolymer has a melting point (Tm) less than, or equal to, 50° C.; and the second ethylene/propylene/non-conjugated diene has a density less than, or equal to, 0.900 g/cc.

12. The composition of claim 1, wherein the first composition has a melt index (I2) less than, or equal to, 2 g/10 min; and wherein the first ethylene/propylene/non-conjugated diene interpolymer has a melting point (Tm) less than, or equal to, 45° C.; and wherein the second ethylene/propylene/non-conjugated diene interpolymer has a density from 0.855 to 0.890 g/cc.

* * * * *